United States Patent
Persson et al.

(10) Patent No.: US 11,175,854 B2
(45) Date of Patent: Nov. 16, 2021

(54) DATA PROCESSING SYSTEMS

(71) Applicant: Arm Limited, Cambridge (GB)

(72) Inventors: Erik Persson, Lund (SE); Stefan Johannes Frid, Lund (SE); Philip Gregory Hall, Bracknell (GB); Dominic Hugo Symes, Cambridge (GB); Sven Ola Johannes Hugosson, Lund (SE); Robert Norberg, Hjarup (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/226,584

(22) Filed: Dec. 19, 2018

(65) Prior Publication Data

US 2019/0196745 A1 Jun. 27, 2019

(30) Foreign Application Priority Data

Dec. 21, 2017 (GB) .................................... 1721548

(51) Int. Cl.
  *G06F 3/00* (2006.01)
  *G06F 3/06* (2006.01)

(52) U.S. Cl.
  CPC .......... *G06F 3/0659* (2013.01); *G06F 3/0613* (2013.01); *G06F 3/0673* (2013.01)

(58) Field of Classification Search
  None
  See application file for complete search history.

(56) References Cited

U.S. PATENT DOCUMENTS 7,991,905 B1 * 8/2011 Roussos ............ H04L 29/08729
                                                    709/231

2007/0245074 A1 * 10/2007 Rosenbluth ............... G06F 5/10
                                                    711/110

FOREIGN PATENT DOCUMENTS

WO   2006/113570   10/2006
WO   2014/201408   12/2014

OTHER PUBLICATIONS

GB Combined Search and Examination Report dated Jun. 15, 2018, GB Patent Application No. GB1721548.4.
Cheng, et al., "VxWorks-based real-time data gathering software design for seismic data acquisition system," 2010 Second IITA International Conference on Geoscience and Remote Sensing, Aug. 28-31, 2010 DOI: 10.1109/IITA-GRS.2010.5603200.
Decker, et al., "Rapidly Adjustable Non-intrusive Online Monitoring for Multi-core Systems," Lecture Notes in Computer Science, vol. 10623: Formal Methods: Foundations and Applications, Nov. 11, 2017.
Dashtbozorgi, et al., "A high-performance and scalable multi-core aware software solution for network monitoring," Journal of Supercomputing, vol. 59, Feb. 2012 DOI: 10.1007/S1127-010-0469-0.

* cited by examiner

*Primary Examiner* — Craig S Goldschmidt
(74) *Attorney, Agent, or Firm* — Vierra Magen Marcus LLP

(57) ABSTRACT

A producer processing unit of a data processing system that is producing a stream of data for use by one or more consumer processing units of the data processing system maintains a record that is accessible to the consumer processing units of a position in the data stream for which it has written data to memory. The consumer processing units then control their reading of the data stream from the memory in accordance with the write position record maintained by the producer processing unit.

21 Claims, 7 Drawing Sheets

DATA PROCESSING SYSTEMS

BACKGROUND

The technology described herein relates to data processing systems, and in particular to the synchronization of the production and use of data streams (sets of data) in data processing systems.

In a data processing system, a "producer" processing unit may produce (generate) a stream of data that is then to be used (e.g. processed) by one or more other "consuming" processing units of the data processing system. An example of this would be in video encoding or decoding. For example, in a video decoding system, a video decoder may decode the encoded bit stream representing a sequence of video frames to be displayed, with one or other processing units then processing the decoded bit stream to display the video frames in the desired manner.

In such arrangements, the "producer" processing unit will typically store the data stream that it is producing in appropriate memory that is shared with (also accessible to) the consumer processing units that are to use the data stream, with the consumer processing units then reading the data stream from the memory for use.

An important aspect of such operation is to synchronize the reading of the data stream from the memory by the consuming processing units with the writing of the data to the memory by the producing processing unit. For example, the consuming processing units must be controlled to avoid their reading operation running ahead of the generation and storage of the data in the memory by the producing processing unit. This may particularly be the case where the producing and consuming processing units are using Direct Memory Access (DMA transfers) to store and read the data from the memory.

The synchronization of such (e.g. DMA) data stream operation is usually provided by an interrupt service routine running on a central processing unit of the overall data processing system. In a complex real-time system, such as video encoding or decoding, this can be a significant burden on the operation of the system.

The Applicants accordingly believe that there remains scope for improved synchronization and handling of data streams that are being shared between producing and consuming processing units in a data processing system, in particular in the situation where the data is being stored and used using Direct Memory Access operations (i.e. independently of any central processing unit (CPU) of the overall data processing system).

BRIEF DESCRIPTION OF THE DRAWINGS

Various embodiments of the technology described herein will now be described by way of example only and with reference to the accompanying drawings, in which.

Like reference numerals are used for like features in the drawings (where appropriate).

Figure 1:
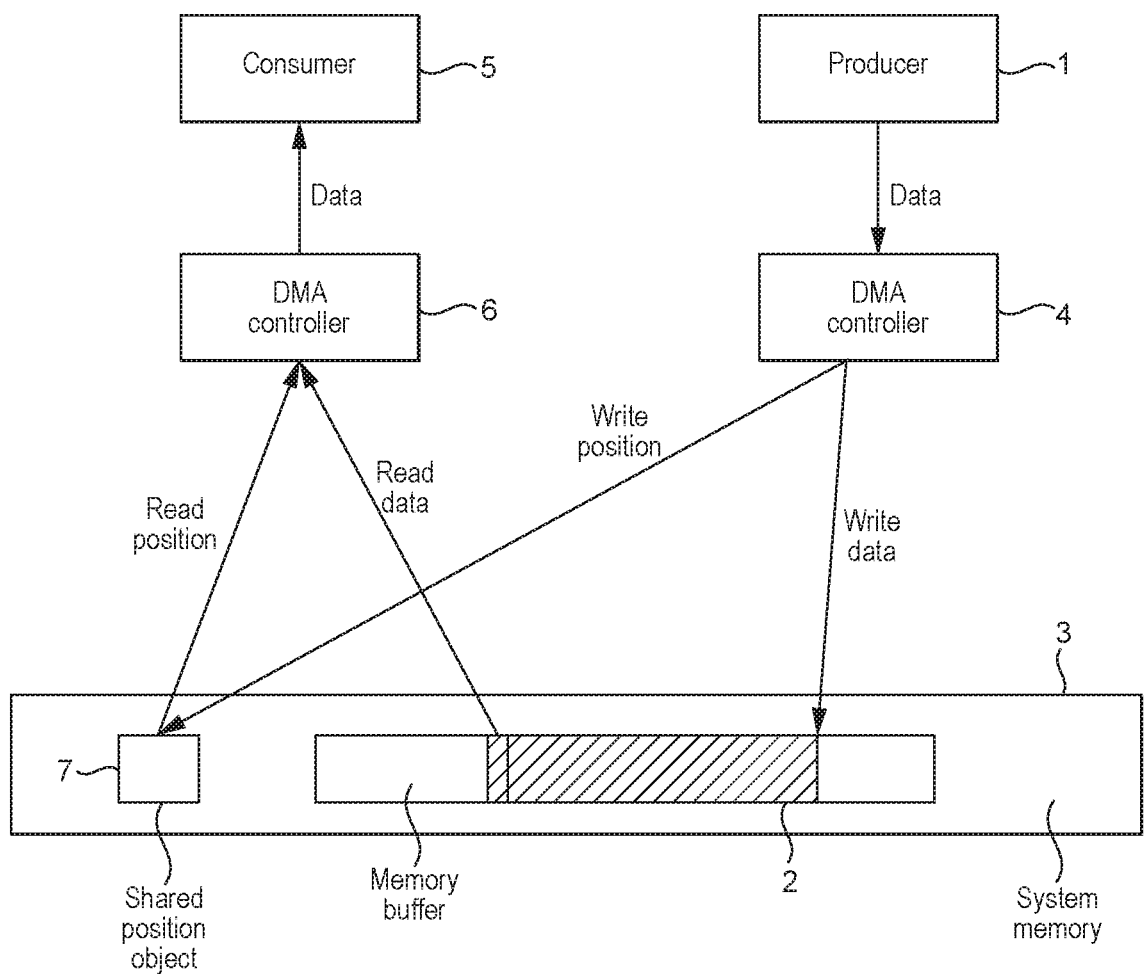
FIG. 1 shows an embodiment of the technology described herein.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

A first embodiment of the technology described herein comprises a method of operating a data processing system in which a producer processing unit of the data processing system is operable to produce a stream of data for use by one or more consumer processing units of the data processing system, the method comprising:

the producer processing unit producing a stream of data and storing the stream of data in memory; and the consumer processing unit or units reading the stream of data from the memory and using the read stream of data;

the method further comprising:

the producer processing unit, as it is producing the stream of data, maintaining a record that is accessible to the consumer processing unit or units that are reading the data stream from the memory of a position in the data stream for which it has written data to the memory; and a consumer processing unit that is reading the data stream from the memory:

monitoring the record of a position in the data stream for which data has been written to the memory maintained by the producer processing unit; and controlling its reading of the data stream from the memory in accordance with the record of a position in the data stream for which data has been written to the memory maintained by the producer processing unit.

A second embodiment of the technology described herein comprises a data processing system comprising:

a producer processing unit operable to produce a stream of data;

one or more consumer processing units operable to use a stream of data produced by the producer processing unit;

and memory for storing a stream of data produced by the producer processing unit;

wherein:

the producer processing unit comprises processing circuitry operable to produce a stream of data and store the stream of data in the memory;

and the consumer processing unit or units comprise processing circuitry operable to read a stream of data from the memory and use the read stream of data;

and the producer processing unit further comprises:

processing circuitry operable to, as it is producing a stream of data, maintain a record that is accessible to a consumer processing unit or units that are reading the data stream from the memory of a position in the data stream for which it has written data to the memory; and a consumer processing unit further comprises processing circuitry operable to:

monitor the record of a position in a data stream for which data has been written to the memory maintained by the producer processing unit; and control its reading of the data stream from the memory in accordance with the record of a position in the data stream for which data has been written to the memory maintained by the producer processing unit.

The technology described herein relates to situations in which a producer processing unit of a data processing system is producing a stream of data that is being used by one or more other consumer processing units of the data processing system. In the technology described herein, the producer processing unit maintains for a data stream that it is producing, a record of a position in the data stream that it has written to memory. The consumer processing units that are to use the data stream then use that position record to control their reading of the data stream from the memory (e.g. to determine whether there is data available for them to read).

Thus the technology described herein, in effect, provides and uses a shared position record which is accessible to both the producing processing unit and the consuming processing unit or units that indicates how far the producer processing unit has progressed with writing the data that is being shared between the producing and consuming processing units (and accordingly allows a processing unit to determine, e.g., when it is "safe" to proceed with reading data from the memory).

Using a shared record of the progression of the producer processing unit when writing the data stream to memory, that can then be read by the consumer processing units, that avoids the need, for example, to have any central processing unit (CPU) of the overall data system involved in ensuring synchronization of the production and use of the data stream. As the need to use the CPU for synchronization purposes can be avoided, power can be saved, and latency from the producing processing unit to the consuming processing units can be reduced. Correspondingly, higher performance can be achieved in systems where a CPU-based synchronization control would be inefficient.

The technology described herein can also reduce or remove the need to provide (additional) signal paths for synchronisation purposes between the producing and consuming processing units.

The technology described herein can be used in any desired and suitable data processing system in which a "producing" processing unit will generate and store data streams for use by one or more "consuming" processing units. Examples of data processing systems to which the technology described herein is particularly applicable include video processing systems, image processing systems, and graphic processing systems.

The producer processing unit correspondingly can be any suitable and desired processing unit of a data processing system that may produce a stream of data for use by one or more other processing units of a data processing system. For example, the producer processing unit may be a video encoder or a video decoder (and in an embodiment that is the case).

The producer processing unit may, for example, be a parser which translates a bitstream of a given video encoding scheme (standard) into an intermediate format suitable for further processing. The intermediate format (and thus the data stream produced by the producer processing unit) may comprise, for example, and in an embodiment, one or more of: prediction modes, motion vectors, and transform coefficients. The producer processing unit could also or instead be a core part of the video encoder which outputs an intermediate format which is then to be translated into a particular video encoding scheme (standard). Again, the intermediate format that is output might comprise prediction modes, motion vectors and/or transform coefficients.

The producer processing unit could also be, for example, an image processing filter unit, which at any given time works on a particular partition (e.g. region) of an image, e.g. for which information needs to be passed on to the processing of another, e.g. the next, image partition. In this case, the consumer processing unit may then be the same or another parallel instance of the image processing filter unit. The data stream correspondingly may be sampling position (e.g. pixel) data used by both partitions (regions) of the image, or control information resulting from the processing of the sampling positions (pixels). An example of an image processing filter of this form would be a de-blocking filter.

In an embodiment, the producer processing unit is a processing unit that is operable to store a data stream in memory using (via) Direct Memory Access (i.e. independently of any central processing unit (host processor) of the data processing system). Thus, in an embodiment, the producer processing unit comprises an appropriate Direct Memory Access (DMA) controller, and writes the data stream to the memory using Direct Memory Access. In an embodiment the producer processing unit comprises processing circuitry operable to produce the stream of data, and a memory controller (and in an embodiment a DMA controller) that is operable to store the stream of data (in an embodiment directly) in memory.

It would also be possible for the producer processing unit to comprise a central processing unit (CPU) of the data processing system. (This is possible without the need for any special changes to the CPU, as the CPU will be able to access the stored and shared position record.)

The technology described herein can be used for all forms of data streams that a processing unit of a data processing system may provide and/or use. Thus, the stream of data that is being produced by the producer processing unit can comprise any suitable and desired stream of data that may be used by other processing units of the data processing system. This may depend, for example, upon the nature of the producer processing unit.

The stream of data may, for example, represent an array or arrays of data elements, such as images or frames for display. Thus, the stream of data that is being produced may comprise image data, and/or may correspond to one or more images or frames of image data.

In an example, the stream of data is a stream of encoded video data or a stream of decoded video data. For example, and as discussed above, the data stream may comprise one or more of: transform coefficients, block parameters such as prediction modes or prediction unit sizes, and filter parameters.

In the case where the technology described herein is being used for video encoding, then it can be used with and for any suitable and desired video encoding scheme (and standard).

A (and each) consumer processing unit can correspondingly be any suitable and desired processing unit of a data processing system that may use a stream of data produced by a processing unit of the data processing system. Thus, for example, and in an embodiment, the consumer processing unit may be an internal stage of video encoding or decoding, such as a processing unit that receives prediction modes, motion vectors and/or transform coefficients for processing. Equally, the consumer processing unit may comprise an image processing filter, e.g. set up to process a partition (e.g. a region) of an image, as discussed above.

The consumer processing unit (or one of the consumer processing units) may be the same unit as the producer processing unit, if desired. Thus, there may be a processing unit that is acting as both the producer and the or a consumer for the data stream.

In an embodiment, a (and in an embodiment each) consumer processing unit is a processing unit that is operable to need a data stream in a memory using (via) Direct Memory Access (DMA). Thus, in an embodiment, a, and in an embodiment each, consumer processing unit comprises an appropriate Direct Memory Access (DMA) controller, and reads the data stream from the memory using Direct Memory Access. In an embodiment a (and each) consumer processing unit comprises processing circuitry operable to use the stream of data, and a memory controller (and in an embodiment a DMA controller) that is operable to read a stream of data (in an embodiment directly) from memory.

A consumer processing unit may use a stream of data that is being produced by the producer processing unit in any suitable and desired manner. This may depend, for example, upon the nature of the consumer processing unit and/or of the data stream in question (e.g. as discussed above).

A consumer processing unit could again be a central processing unit (CPU) of the data processing system, if desired.

There may be only one consumer processing unit that is using the data stream, but in an embodiment there can be, and in an embodiment is, more than one (plural) consumer processing units using the (same) data stream. In this case, each of the plural consumer processing units will use (and read) the same, single, shared write position record for the data stream in question. Where plural consumer processing units are reading and using the same data stream, each of the consumer processing units in an embodiment operates (independently of the other consumer processing units) in the manner of the technology described herein.

The memory in which the data stream is stored (and from which the data stream is read) may be any desired and suitable memory of or for the data processing system, such as, and in an embodiment, a main memory for the processing units in question (e.g. where there is a separate memory system for the processing units in question), and/or a main memory of the data processing system that is shared with other elements, such as a host processor (CPU) of the data processing system.

The memory may be external to the processing units in question. In an embodiment, the memory is an external DRAM.

Other arrangements would, of course, be possible.

The shared record of a position in the data stream for which the producer processing unit has written data to the memory can take any suitable and desired form. In an embodiment, the record is an indication of how far the producer processing unit has progressed with writing the data stream. The record could indicate an actual position in the data stream that has been written but in an embodiment indicates a (relative) position in the data stream that the producer processing unit has written to the memory, relative to a particular, in an embodiment selected, in an embodiment predetermined, position in the data stream, such as, and in an embodiment, relative to the start of the data stream. Thus, for example, the record could, and in an embodiment does, comprise an appropriate data word (e.g. a 32-bit word) that indicates an offset (e.g. and in an embodiment the byte offset) into the data stream up until which data has been written to the memory.

The position record is in an embodiment maintained (stored) in memory, and in an embodiment in an appropriately shared memory that is accessible to both the producer processing unit and the desired consumer processing units. In an embodiment, the position record is maintained (stored) in the same memory as the data stream itself (e.g. in an appropriate shared system memory). In another embodiment the position record is stored in a memory other than the main system memory where the data stream itself is being stored. For example, in the case where the processing units (e.g. their DMA controllers) have access to shared local memory (e.g. on-chip SRAMs), then the position record could instead be maintained and stored in one of the shared local memories.

The shared position record is in an embodiment maintained by an appropriate memory controller (e.g. DMA controller) of the producer processing unit.

In an embodiment, the position record for a data stream is associated with an identifier that identifies the data stream to which the position record relates. This will then allow, for example, multiple position records for plural different data streams to be maintained and used simultaneously.

Thus, in an embodiment, the operation in the manner of the technology described herein is performed for plural data streams that are being produced and used at the same time, with an appropriate shared position record being maintained for each "active" data stream. In this case, the different data streams could be being produced by different producer processing units, or a given producer processing unit may be producing plural data streams at the same time (e.g. in the case where the producer processing unit (and, e.g., its DMA controller) can support plural active data channels at any given time), or a combination of the two.

Thus, in an embodiment, the data processing system comprises plural producer processing units, each of which operates in the manner of the technology described herein.

Correspondingly, it can be the case that a given consumer processing unit is consuming plural data streams at the same time, e.g. produced by the same or different producer processing units.

Where plural data streams are being produced and used, then a given (and each) data stream will have its own position record that is associated with that data stream and that is maintained and used in the manner of the technology described herein.

The identifier that is used for a data stream can be any suitable and desired identifier that can identify that data stream (uniquely) from other data streams for which shared position records are being maintained. The identifier may be provided, for example, as part of the job descriptor for the data stream in question.

In an embodiment, the shared position record for a data stream also includes other information (in addition to a current position for the data stream that has been written to memory and an identifier for the data stream (if provided). This other information could comprise any suitable and desired "sideband" information that, e.g. that may be useful to a consumer processing unit that is using the data stream.

In an embodiment, such additional information can, and in an embodiment does, comprise an indication (e.g. an "end" flag) which indicates that the producer processing unit will not write any more data to the data stream.

In an embodiment, it is possible to indicate particular partitions within the data stream, so as to, for example, be able to partition the data stream into sections. This could be used to indicate boundaries between variably sized blocks in a data stream (e.g. video macro blocks where the data stream is video data), and/or, e.g., to indicate the start of a new data array (e.g. image) in a data stream, etc. This is in an embodiment done by using an appropriate "section end" indication (e.g. flag), although other arrangements would, of course, be possible.

While it would be possible for the producer processing unit to update the shared position record every time it writes new data for the data stream to the memory, in an embodiment, the producer processing unit (e.g. its DMA controller) does not do that, but is configured to update the shared position record that is available to the consumer processing unit(s) for a stream of data that it is producing periodically. This will help to reduce the overhead (e.g. bandwidth consumed) for the shared position record maintenance and operation.

A producer processing unit can update the shared position record for a data stream that it is generating at any appropriate frequency. As the update frequency may affect any latency between the data being written by the producer processing unit and being used by a consumer processing unit, the update frequency is in an embodiment selected based on a desired or suitable latency for the use of the data stream by the consuming processing units. It may also take account of other latencies in the system (e.g. in the overall memory system operation). In an embodiment, the frequency at which updates of the shared position records are made depends on and/or is based on any latency in the memory transfer system.

In an embodiment, a producer processing unit updates the shared position record for a data stream that it is producing at regular (time) intervals, e.g. after each particular, in an embodiment selected, number of clock cycles. In an embodiment, the position records are updated every few thousand clock cycles (e.g. every 2000 clock cycles).

Other arrangements would, of course, be possible.

In an embodiment, the producer processing unit maintains a separate, local position record of the position in the data stream for which it has written data to the memory for a data stream (and in an embodiment for each of the data streams) it is currently writing to memory, and then periodically updates the shared position record that is accessible to the consumer processing units for the data stream based on its local position record.

In an embodiment, the local position record is indicative of (indicates) the latest position in the data stream for which the producing consumer unit has written data to the memory. Thus, the local position record is, in an embodiment, updated with a (new) write position each time the producer processing unit writes data for the data stream to the memory.

In these arrangements, the local position record need not be, and in an embodiment is not, accessible to any other processing units of the data processing system (i.e. it is in an embodiment only accessible to the producer processing unit itself).

Thus, in an embodiment, the method of the technology described herein comprises the producer processing unit (and the producer processing unit comprises processing circuitry operable to), as it is producing a stream of data and storing that stream of data in memory, maintaining a local record of the position in the data stream for which it has written data to the memory; and periodically updating the record of a position in the data stream for which it has written data to the memory that is accessible to the consumer processing unit(s) based on its local position record of the position in the data stream for which it has written data to the memory.

It should be noted in this regard that in these arrangements, the shared position record for a data stream may accordingly not (always) indicate the actual position in the data stream that the producer processing unit has currently reached (stored to memory) but will, and in an embodiment does, indicate the position that has been reached at the time the shared position record was last updated. Thus, the shared position record may "lag behind" the actual latest position that has been written to the memory.

It should also be noted in this regard that the producer processing unit can, and in an embodiment does, continue to write the data for the data stream to the memory as and when it produces that data, even if it does not update the shared position record. (It is just the shared position record that is to be used by the consumer processing units that will only be updated with a position in the data stream for which data has been written to the memory periodically, not the actual data that is being stored in the memory.)

In an embodiment, a producer processing unit is operable to, when it has written new data to memory, update its local position record for the data stream in question, and also to set an indication (e.g. a flag) that is associated with the local position record for that data stream to show that that local position record has been updated. Then, when the next periodic shared position record update is triggered, the producer processing unit in an embodiment determines from the update flag(s) associated with its local position record(s), which of the local position record(s) have been updated, and so accordingly which shared position record(s) for use by the consumer processing units to update.

Correspondingly, once a shared position record has been updated, the update indication (e.g. flag) associated with the corresponding local position record is in an embodiment then cleared to indicate that the shared position record has been updated with the latest local position record position (with the local position record update indication then being set again once the local position record is updated with a new position in the data stream).

Thus, in an embodiment, a producer processing unit will periodically (e.g. every few thousand clock cycles) check its local data stream position records, and for each local data stream position record that is indicated as having been updated since the last check, will update the shared position record for that data stream. This process is then repeated on the next "maintenance" cycle, and so on.

Thus, in an embodiment, the producer processing unit maintains a local set of one or more position records for data streams that it is producing and writing to memory, and maintains a record of which of those local position records have been updated since it last updated the corresponding shared position records for the data streams that are accessible to the consumer processing unit or units that are using the data streams, and periodically updates the shared position records accordingly (i.e. based on which local position records have been updated since the shared position records were last updated).

Other arrangements would, of course, be possible.

A consumer processing unit can use the shared record of a position in the data stream for which the producer processing unit has written data to the memory to control its reading of the data stream from the memory in any suitable and desired manner. In an embodiment a consumer processing unit (and each consumer processing unit) uses the shared position record to (try to) ensure that it does not (try to) read data beyond the position in the data stream indicated by the shared position record.

Thus, a consumer processing unit is, in an embodiment, operable to, and in an embodiment operates to, avoid attempting to read data from a data stream that is at a position in the data stream that is beyond the position indicated by the shared position record for the data stream. In other words, a consumer processing unit will control its reading operation to read data up to but not beyond the position indicated by the shared position record for the data stream in question.

In an embodiment, a consumer processing unit uses the shared position record to determine when it is safe to proceed with reading data for the data stream from the memory (e.g., and in an embodiment, to determine when there is sufficient data stored in the memory for the data stream such that, e.g., and in an embodiment, a given memory transaction will read a complete set of valid data for the data stream).

Correspondingly, a consumer processing unit in an embodiment uses the shared position record to avoid attempting to read data for a data stream from memory that has not already been stored in the memory. Thus, if a consumer processing unit wishes to read data from the data stream from a position beyond the position indicated in the shared position record, the consumer processing unit in an embodiment stalls it reading operation until the shared position record indicates that the required data has been stored in the memory.

In order to facilitate this operation, a consumer processing unit in an embodiment maintains a separate, local record that is indicative of a position in the data stream for which data for the data stream has been written to the memory (such that the consumer processing unit can know that it is safe to read data up to that position in the data stream). This local record should be and is in an embodiment, separate to the shared write position record that is being maintained by the producer processing unit, and is in an embodiment accessible only to the consumer processing unit in question.

Again, a consumer processing unit in an embodiment does this for each data stream that it is currently reading (and so can maintain a local position record for plural data streams, where appropriate).

In an embodiment, a consumer processing unit maintains a (local) record of the position in the data stream that it has read up to, and determines whether it can proceed with its reading operation by comparing its current read position to a current write position (that it has determined from the shared written position record) for the data stream in question.

In an embodiment, this is achieved by the consumer processing unit subtracting its current read position from the indicated write position from the shared record of the write position for the data stream in question that it last read, so as to thereby leave a remaining "credit" "readable" amount of data for the data stream in the memory that can (safely) be read by the consumer processing unit. The consumer processing unit then in an embodiment maintains and updates a (in an embodiment local) record of this remaining "credit" available amount of data that can be read as it reads the data (as its read position in the data stream moves), so as to determine when it is approaching or has reached the latest write position for the data in the data stream that it is aware of.

Thus, a consumer processing unit in an embodiment compares (e.g. subtracts) its current read position from a write position that it has read from the shared write position record, so as to determine a "credit" amount of data that is stored and available in the memory that the consumer processing unit can read up to, and then stores and tracks locally its use (consumption) of that available data.

Thus, in an embodiment, the separate, local record that is indicative of a position in the data stream for which data in the data stream has been written to the memory that is maintained by a consumer processing unit comprises an indication of an available amount of data that is stored in the memory that the consumer processing unit can read up to.

This available amount of data is in an embodiment set to zero initially, and then updated once the appropriate shared write position record for the data stream has been read. The "credit" amount of data available to read is in an embodiment determined and tracked in a signed manner (i.e. the "credit" value is signed), as that will, e.g., facilitate determining the available data even when the shared write position record "wraps" back to zero (which could happen for large data streams, depending on the size of the shared write position record field).

The shared write position record is in an embodiment read by an appropriate memory controller (e.g. DMA controller) of the consumer processing unit. Correspondingly, the separate, local record (e.g. amount of available data) that is indicative of a position in the data stream that the consumer unit can read up to is in an embodiment maintained by an appropriate memory controller (e.g. DMA controller) of the consumer processing unit.

It would be possible for a consumer processing unit to continuously read the shared write position record for a data stream that it is using, e.g. every time it reads data for the data stream from the memory.

However, in an embodiment, a consumer processing unit that is using a data stream that is being written to the memory by a producer processing unit does not do that, but operates to (and is configured to) (only) read the shared position record for the data stream periodically, e.g. and in an embodiment, at regular intervals and/or in response to a particular event or events.

In an embodiment, when a consumer processing unit is to first start reading and using a data stream, the consumer processing unit in an embodiment reads the shared position record for that data stream at regular (time) intervals, e.g. every few thousand (e.g. every 2000) clock cycles, until the shared write position record indicates that data for the data stream has been written to the memory. At that point, the consumer processing unit in an embodiment then determines, based on its current desired read position for data in the data stream, the amount of data that it can read from the memory for the data stream based on the indicated write position (as discussed above), and proceeds to read data for the data stream from the memory accordingly.

The consumer processing unit could in this arrangement then continue to read the shared write position record, e.g. at fixed intervals (e.g. every few thousand clock cycles), so as to update the write position so as to allow it to read more data. However, in an embodiment, once a consumer processing unit has begun to read data for a data stream from the memory, the consumer processing unit is configured to keep track of how much data is available for it to read based on the latest write position that it has read from the shared write position record and its current read position (as discussed above), and is operable to, and operates to, read the write position record for the data stream so as to update its local record of the write position that has currently been reached for the data stream (only) when the determined amount of data available for it to read falls below a particular, in an embodiment selected, in an embodiment predetermined, threshold amount. The threshold is in an embodiment set so that the necessary bandwidth can be guaranteed in combination with the polling interval being used. This will then mean that a consumer processing unit may be configured, e.g. to only read the shared write position record for a data stream that it is using when it is expecting to want to read more data than it currently knows has been written to the memory for the data stream. This will accordingly reduce the frequency at which a consumer processing unit reads a shared write position record for a data stream.

Thus, in an embodiment, a consumer processing unit that is using a data stream that is being written to memory by a producer processing unit initially checks the shared position record for the data stream at particular, in an embodiment selected, in an embodiment predetermined time intervals (e.g., and in an embodiment, at fixed time intervals), until the shared position record indicates that there is data present in the memory for the data stream (at least at a position that the consumer processing unit wishes to read). In response to this, the consumer processing unit will then keep track of how far along the data stream it has read relative to the latest shared write position that it has read, and when it is approaching the read previously indicated write position (e.g., and in an embodiment, a certain threshold before then), the consumer processing unit will read the shared write position record anew to determine the current latest write position indicated in the shared write position record for the data stream (i.e. to update its local record of the latest write position).

It should be noted in this regard that even if a consumer processing unit has reached a threshold position for triggering an update of its local record of the latest write position, the consumer processing unit may, and in an embodiment does, continue to read data from the memory past that threshold position (but not past the actual latest write position that it is aware of).

It would be possible for a consumer processing unit to read the shared write position record for a data stream (substantially) immediately it determines that the available amount of data has fallen below the threshold (and in one embodiment, this is what is done).

In an embodiment, a consumer processing unit that is using a data stream that is being written to the memory by a producer processing unit operates to (and is configured to) (only) read the shared position record for the data stream once it determines that the available amount of data to read has fallen below the threshold at a next instance of a regular "update" ("maintenance") cycle.

To facilitate this, in an embodiment, a consumer processing unit is configured to determine if it should read a shared write position record for any data streams that it is using at regular (time) intervals (i.e. at a regular, in an embodiment fixed, "maintenance" cycle (frequency)), e.g. every few thousand (e.g. every 2000) clock cycles, and if the consumer processing unit then determines that the shared write position record should be read for a data stream, reads that shared write position record (and updates the amount of data that it can read from the memory for the data stream based on the indicated write position (as discussed above) accordingly).

To facilitate this, in an embodiment, a consumer processing unit is operable to, when it determines that the available amount of data has fallen below the threshold for a data stream it is reading, set an indication (e.g. a flag) that is associated with its local position record (available data record) for that data stream to show that the threshold amount of remaining data to trigger an update from the shared write position record has been reached. Then, when the next periodic shared write position record update determination is triggered, the consumer processing unit in an embodiment determines from the update flag(s) associated with its local position (available data) record(s), which of the local position record(s) need updating, and so accordingly which shared write position record(s) to read.

In an embodiment, a consumer processing unit is operable to, and operates to, also set the "update" flag for a data stream when it first starts to use the data stream (e.g. by recognising that the initial amount of available data to read for the data stream is zero (and so is below the threshold)), so as to trigger an update from the shared write position when the next periodic shared write position record update determination is triggered.

Correspondingly, once a local position record has been updated, the update indication (e.g. flag) associated with the local position record is in an embodiment then cleared to indicate that the local position record has been updated with the latest shared write position record position (with the local position record update indication then being set again once the determines that the available amount of data has fallen below the threshold).

Thus, in an embodiment, a consumer processing unit will periodically (e.g. every few thousand clock cycles) check its local data stream position records, and for each local data stream position record that is indicated as needing to be updated, will read the shared write position record for that data stream (and update its local position record for that data stream accordingly). This process is then repeated on the next "maintenance" cycle, and so on.

Thus, in an embodiment, a (and in an embodiment each) consumer processing unit maintains a local set of one or more position records for data streams that it is reading from memory, and maintains a record of which of those local position records need to be updated (which is, e.g., and in an embodiment, determined by the available amount of data to read (as currently determined by the consumer processing unit) being below threshold value), and periodically updates the local position records accordingly (i.e. based on which local position records are indicated as needing to be updated).

Other arrangements would, of course, be possible.

In these arrangements, any threshold value for triggering an update of a consumer processing unit's local position records may, e.g., and in an embodiment, be based on the periodic "maintenance" cycle period that is being used (e.g. to try to ensure that the remaining threshold amount of available data will not be exceeded (used up) before the local record is updated).

The above operation of the technology described herein relates to the tracking of a write position in a data stream that a producer processing unit is producing, so as to allow, for example, consumer processing unit(s) that are to read the data stream to avoid attempting to read data that has not yet been written to the memory for the data stream.

In effect therefore, the above operation of the technology described herein can be said to track "write-after-read" hazards since it can prevent a write operation coming after the corresponding read operation.

The applicants have further recognised that the principles of the technology described herein could equally be used to track "read-after-write" hazards, i.e. to ensure that data for a data stream that is stored in a memory is not overwritten until that data has been read by a consumer processing unit that needs it.

In this case, the operation of the technology described herein would be used to maintain a shared read position record, with a given producer processing unit that is writing new data to the memory then using the shared read position information to (try to) ensure that it does not overwrite data in the memory until that data has been read.

Thus, in an embodiment, a consumer processing unit reading a stream of data from the memory can, and in an embodiment does, maintain a shared read position record indicative of a position in the data stream that it has read from the memory, and a corresponding producer processing unit or units that wishes to write data to the memory can, and in an embodiment does, use that shared read position record to control its write operations, e.g., and in an embodiment, so as to (try to) ensure that they do not write over data that is still to be read by the consumer processing unit.

Such an arrangement could then be used to free up memory in a more controlled way so that it can be re-written safely after the existing data in the memory has been read.

Thus, a further embodiment of the technology described herein comprises a method of operating a data processing system in which a producer processing unit of the data processing system is operable to produce a stream of data, and to store the stream of data in memory, and one or more other consumer processing units are operable to read streams of data produced by a producer processing unit from the memory for use, the method comprising:

a producer processing unit producing a stream of data and storing the stream of data in memory; and a consumer processing unit reading a stream of data from the memory for use;

the method further comprising:

the consumer processing unit, as it is reading the stream of data, maintaining a record that is accessible to the producer processing unit that is storing a data stream in the memory, of a position in the data stream for which it has read data from the memory; and the producer processing unit that is storing a data stream in the memory:

monitoring the record of a position in the data stream for which data has been read from the memory maintained by the consumer processing unit; and controlling its writing of the data stream to the memory in accordance with the record of a position in the data stream for which data has been read from the memory maintained by the consumer processing unit.

Another embodiment of the technology described herein comprises a data processing system comprising:

a producer processing unit operable to produce a stream of data;

a consumer processing unit operable to use a stream of data produced by a producer processing unit; and a memory for storing a stream of data produced by the producer processing unit;

wherein:

the producer processing unit comprises processing circuitry operable to produce a stream of data and store the stream of data in the memory; and the consumer processing unit comprises processing circuitry operable to read a stream of data from the memory and use the read stream of data; and the consumer processing unit further comprises:

processing circuitry operable to, as it is reading a stream of data, maintain a record that is accessible to a producer processing unit that is writing a data stream to the memory, of a position in the data stream for which it has read data from the memory; and the producer processing unit further comprises processing circuitry operable to:

monitor the record of a position in a data stream for which data has been read from the memory maintained by a consumer processing unit; and control its writing of the data stream to the memory in accordance with the record of a position in the data stream for which data has been read from the memory maintained by the consumer processing unit.

As will be appreciated by those skilled in the art, these embodiments of the technology described herein can, and in an embodiment do, include any one or more or all of the features of the technology described herein.

Thus, for example, the maintenance and use of the shared read position record is in an embodiment performed in a corresponding manner to the use and maintenance of the shared write position record discussed above. Thus, for example, a consumer processing unit reading a data stream and maintaining a shared read position record will in an embodiment update that shared read position record periodically, in an embodiment at fixed intervals, with the producer processing unit correspondingly checking that shared read position record at appropriate intervals as it writes its data to the memory.

In these embodiments of the technology described herein, the consumer processing unit could be reading the data stream that the producer processing unit that is using the shared read position record to control its writing of the data stream to the memory) is producing (i.e. the consumer processing unit and the producer processing unit will be working on the same data stream) (and in an embodiment that is the case). Alternatively, the consumer processing unit could be reading one data stream, with the producer processing unit producing a different data stream that is not being read by the consumer processing unit in question (i.e. whose shared read position record the producer processing unit is using to control its writing of the data stream to the memory).

The applicants have further recognised that the principles of the technology described herein could equally be used to track "write-after-write" hazards, i.e. to ensure that a given, particular, set of data is written before another given, particular set of data is written to the memory. This may be desirable, for example, where it is desired to try to make sure that certain data (e.g. blocks of payload data) is or are written to memory before other, e.g. related, data (such as a corresponding header (e.g. metadata) for the payload data) is written to the memory (so as to then (try to) ensure that it will be safe to read the e.g. payload, data once the corresponding e.g. header (e.g. metadata), has been seen).

In this case, the operation of the technology described herein would be used to keep track of a shared write position in the memory, but with a given producer processing unit that is writing new data to the memory then using the shared write position information to (try to) ensure that it does not write certain data to the memory until particular data for the data stream has been written to the memory (e.g. a particular position in the data stream has been written to the memory).

In this case therefore, a producer processing unit writing a stream of data to the memory would maintain a shared write position record indicative of a position in the data stream that it has written to the memory, and the same (or another) producer processing unit or units that wish to write (other) data to memory would use that shared write position data to control their write operations, e.g., and in an embodiment, so as to (try to) ensure that they do not write particular, e.g., selected, data, before (until) a particular, in an embodiment selected, position in the data stream has been written to memory.

Thus, in an embodiment, when a producer processing unit writing a stream of data to memory is maintaining a shared write position record indicative of a position in the data stream that it has written to the memory, a producer processing unit or units that wishes to write data to memory can, and in an embodiment does, use that shared write position record to control its write operations, e.g., and in an embodiment, so as to (try to) ensure that it or they do not write particular, in an embodiment selected, data to memory before (until) a particular, in an embodiment selected, position in the data stream has been written to memory.

Thus, another embodiment of the technology described herein comprises a method of operating a data processing system in which producer processing units of the data processing system are operable to produce streams of data for use by one or more consumer processing units of the data processing system, the method comprising:

a first producer processing unit producing a stream of data and storing the stream of data in memory;

the first producer processing unit, as it is producing the stream of data, maintaining a record that is accessible to a producer processing unit or units that are producing other data and storing the other data in memory, of a position in the data stream for which it has written data to the memory; and a producer processing unit that is producing other data and storing the other data in memory:

monitoring the record of a position in the data stream for which data has been written to the memory maintained by the first producer processing unit; and controlling its writing of the other data to memory in accordance with the record of a position in the data stream for which data has been written to the memory maintained by the first producer processing unit.

Another embodiment of the technology described herein comprises a data processing system comprising:

one or more producer processing units operable to produce streams of data and/or other data; and a memory for storing a stream of data and other data produced by a producer processing unit;

wherein:

a first producer processing unit comprises:

processing circuitry operable to produce a stream of data and store the stream of data in the memory; and processing circuitry operable to, as it is producing a stream of data, maintain a record that is accessible to a producer processing unit or units that are producing other data and storing the other data in memory, of a position in the data stream for which it has written data to the memory; and a producer processing unit further comprises processing circuitry operable to, when it is producing other data and storing the other data in memory:

monitor the record of a position in a data stream for which data has been written to the memory maintained by the first producer processing unit; and control its writing of the other data to memory in accordance with the record of a position in the data stream for which data has been written to the memory maintained by the first producer processing unit.

As will be appreciated by those skilled in the art, these embodiments of the technology described herein can, and in an embodiment do, include any one or more or all of the features of the technology described herein.

Thus, for example, the maintenance and use of the shared write position record is, in an embodiment, performed in the manner discussed above. Thus, for example, a producer processing unit producing a data stream and maintaining a shared write position record will, in an embodiment, update that shared write position record periodically, in an embodiment at fixed intervals, with the producer processing unit(s) correspondingly checking that shared write position write record at appropriate intervals as it writes the other data to the memory.

In these arrangements and embodiments of the technology described herein, the producer processing unit that is producing the data stream and maintaining the shared write position record may be the same as or different to the producer processing unit that is writing the other data to the memory (in accordance with the shared write position record). Thus, in one arrangement, the first producer processing unit and the producer processing unit that is writing the other data to memory will be the same processing unit, but in other embodiments those processing units will be different. (Operation in this manner may be useful when the same producer processing unit is both producing the data stream and maintaining the shared write position record and is also writing the other data to the memory (in accordance with the shared write position record), as even where this operation is being performed by the same producer processing unit, there may be latencies associated with the memory transfer, as the data produced during one operation may be in flight for a certain time between one operation producing it until it is available to be read for consumption by the next operation by the same unit. Latency may result, for example, from bandwidth bottlenecks in the main memory interconnect causing data to build up in buffers (e.g. FIFOs) of the memory controller (e.g. DMA controller), and/or delays, e.g., in the bus (e.g. AXI) write response from the main memory from the time that a write access has been issued.)

The data stream and the other data that is being written to the memory in these embodiments of the technology described herein can comprise any suitable and desired data stream and other data. In an embodiment, the data stream comprises some form of payload data, and the other data is data that is related to that payload data, such as metadata relating to the payload data, such as, and in an embodiment, a header or headers relating to the payload data.

Other arrangements would, of course, be possible.

In an embodiment, the processing units of the data processing system can operate in one or more, and in an embodiment all, of the above manners, i.e. to track one or more of, and in an embodiment all of "write-after-read", "read-after-write", and "write-after-write" hazards.

In an embodiment, it can be indicated to a given processing unit whether and how it is to operate in the manner of the technology described herein when producing or using a data stream. Thus, for example, a processing unit can in an embodiment be instructed to maintain a shared position record and/or use a shared position record to control its operation, as desired. This is in an embodiment done by including appropriate indications (e.g. flags) in a (job) descriptor that is provided to a processing unit to define the job (task) that the processing unit is to perform in relation to a data stream (e.g. whether it is to produce the data stream or whether it is to use the data stream (and how)). Other arrangements would, of course, be possible.

Equally, a given processing unit that is handling multiple data streams simultaneously (at the same time), could be configured to operate in the same manner for each data stream, or in different manners for different data streams, as desired.

It would also be possible for a processing unit to act both as a producer processing unit and as a consumer processing unit, if desired. In this case, the processing unit could act solely as either a producer processing unit or a consumer processing unit at any given time, or it could be the case that the processing unit is acting as both a producer processing unit for one or more data streams, and as a consumer processing unit for one or more (e.g. other) data streams, at the same time (simultaneously) if desired. In this case, the processing unit in an embodiment acts appropriately in the manner of the technology described herein for each data stream that it is actively handling.

Any one or more or all of the processing units of the technology described herein may be embodied as processing unit circuitry, e.g., in the form of one or more fixed-function units (hardware) (processing circuitry), and/or in the form of programmable processing circuitry that can be programmed to perform the desired operation. Equally, any one or more or all of the processing units and processing unit circuitry of the technology described herein may be provided as a separate circuit element to any one or more of the other processing units or processing unit circuitry, and/or any one or more or all of the processing units and processing unit circuitry may be at least partially formed of shared processing circuitry.

The processing units may be part of an appropriate overall processor, such as a video processor (video processing unit) or a graphics processor (graphics processing unit).

The processing units and/or data processing system described herein in any embodiment may comprise, or may be, or may form part of, a system on chip (SoC).

As well as the particular processing units, the data processing system of the technology described herein can otherwise include any suitable and desired elements, and units, etc, that a data processing system may include. Thus, in an embodiment, the data processing system further includes a host (e.g. central) processor. The host processor may, for example, execute applications that require data processing by the processing units of the system data processing system. The host processor may send appropriate commands and data to the processing units to control them to perform the data processing operations and to generate and/or use a data stream or streams required by applications executing on the host processor. To facilitate this, the host processor may execute a driver or drivers for the processing units and/or may execute a compiler or compilers for compiling programs to be executed by a programmable execution unit(s) of the processing unit(s).

In embodiments, the processing unit(s) or system may comprise, and/or may be in communication with, one or more memories and/or memory devices that store the data described herein, and/or store software for performing the processes described herein. The processing unit(s) or system may comprise, and/or may be in communication with a display for displaying images based on the data stream. The processing unit(s) or system may comprise, and/or may be in communication with a video camera that generates arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, units, and "means" of the technology described herein may comprise a suitable processor or processors, controller or controllers, functional units, circuitry, circuits, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

The various steps or functions, etc., of the technology described herein may be duplicated and/or carried out in parallel on a given processor. Equally, the various processing units, etc., may share processing circuitry, etc., if desired.

Subject to any hardware necessary to carry out the specific steps or functions, etc., discussed above, the system can otherwise include any one or more or all of the usual functional units, etc., that data processing systems include.

In an embodiment, the various functions of the technology described herein are carried out on a single data processing platform that generates and outputs the data streams(s) in question.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

FIG. 1 illustrates the basic operation of the embodiments of the technology described herein.

As shown in FIG. 1, it is assumed that a producer processing unit 1 is writing a data stream 2 to a memory buffer in system memory 3 in a Direct Memory Access (DMA) manner via an associated DMA controller 4.

The data stream 2 written in the memory 3 is correspondingly being read in a Direct Memory Access (DMA) manner by a consumer processing unit 5 which again has an appropriate associated DMA controller 6.

The data stream 2 may, e.g., be encoded video data that has been produced by the producer processing unit, with the consumer processing unit 5 then reading the encoded video data and decoding it, e.g., for display.

As shown in FIG. 1, and in accordance with the technology described herein, the producer processing unit 1, as well as writing the data stream 2 to the memory 3, also stores in the memory 3 a record (a shared position object) 7 of a position in the data stream 2 for which it has written data to the memory. Correspondingly, the consumer processing unit 5 reads the position record 7 maintained by the producer processing unit 1 to control its reading of the data stream 2 from the memory. In this way, the consumer processing unit 5 can use the shared position record 7 to determine when it is safe to read further data of the data stream 2 from the memory 3.

Figure 2:
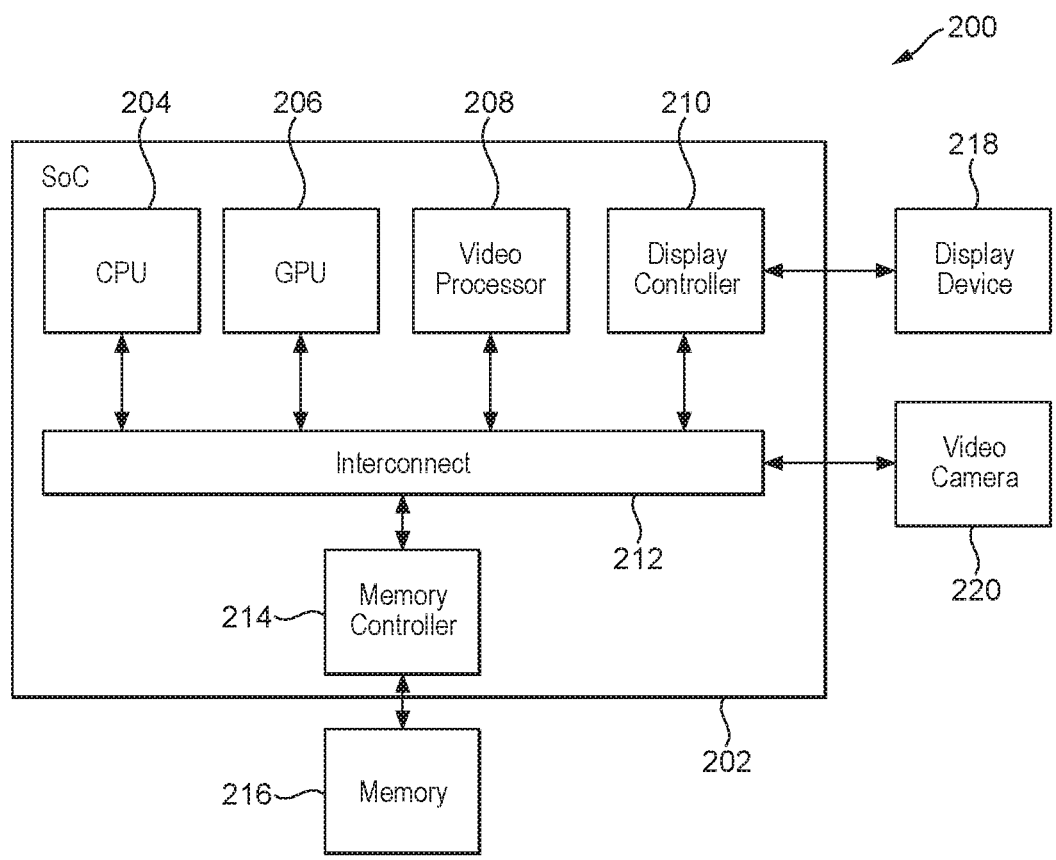
FIG. 2 shows schematically a data processing system that can operate according to embodiments of the technology described herein.

FIG. 2 shows schematically a data processing system in which the present embodiments, such as the arrangement illustrated in FIG. 1, can be used and implemented.

As shown in FIG. 2, the data processing system 200 comprises a data processing apparatus in the form of a system on chip (SoC) 202. The system 200 also comprises off-chip (main) memory 216, a display device 218 and a video camera 220.

The SoC 202 comprises a central processing unit (CPU) 204, a graphics processing unit (GPU) 206, a video processor 208, a display controller 210, an interconnect 212 and a memory controller 214.

As is shown in FIG. 2, the CPU 204, GPU 206, video processor 208, and display controller 210 communicate with each other via the interconnect 212 and with the memory 216 via the interconnect 212 and memory controller 214. The display controller 210 also communicates with the display device 218. The video camera 220 also communicates with the SoC 202 via the interconnect 212.

The video processor 208 may read in image data from memory 216 and/or from video camera 220, encode the image data, and then output the encoded image data, e.g. for storage in memory 216 or for streaming to another device. The encoded image data can later be retrieved and decoded, e.g. by the video processor 208, or received and decoded by another device. The decoded image data can be output, e.g. by the display controller 210 to the display device 218 or by another device, for display.

In the present embodiments, it is assumed that the video processor 208 is a "multi-core" video processor, i.e. includes plural respective video processing cores, that can each, e.g., process respective video frames and/or parts of a given video frame.

Figure 3:
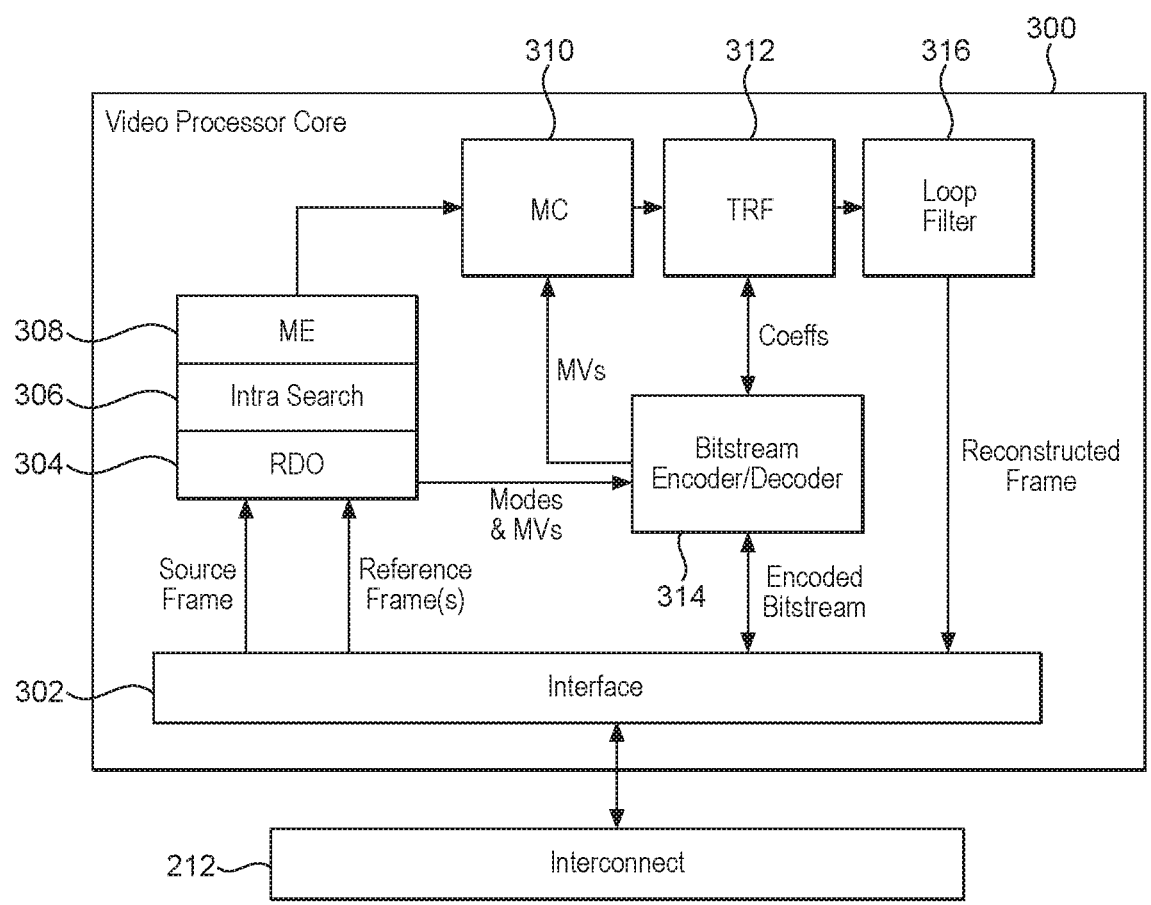
FIG. 3 shows schematically a video processing core that can operate according to embodiments of the technology described herein.

FIG. 3 shows in more detail an exemplary video processing core 300 of the multi-core video processor 208.

As shown in FIG. 3, each video processing core 300 of the video processor 208 comprises an interface 302 to the interconnect 212 for writing to and from the main memory 216 data, such as "source" video frames to be encoded, "reference" frames that may be used when encoding or decoding a frame, reconstructed (decoded) frames for output, and an encoded bitstream representing video frames in an encoded manner.

The video processing cores 300 can use any suitable and desired video encoding and decoding process, such as HEVC. In the present embodiments it is assumed that the video processing cores will use a block-based, differential encoding/decoding process, such as HEVC.

This being the case, as shown in FIG. 3, the video processing cores each include, inter alia, inter search circuitry 306 that, for a given source block in a source frame to be encoded, can search within the source frame itself for one or more suitable candidate reference blocks to consider using when encoding that source block, and ME (motion estimation) circuitry 308 that, for a given source block in a source frame to be encoded, can search within one or more reference frames for one or more suitable candidate reference blocks to consider using when encoding that source block.

The video processing cores 300 also include RDO (Rate Distortion Optimisation) circuitry 304 that performs a rate distortion optimisation process to select the particular set of encoding options to use for regions and blocks of a frame being encoded.

The video processing cores 300 also include motion compensation (MC) circuitry 310 that is operable to apply a motion vector generated by the ME circuitry 308 to a selected reference frame to derive a selected reference block.

The video processing cores 300 further include transform (TRF) circuitry 312 that is operable to, when encoding a video frame, determine difference values (residuals) for a block being encoded and to transform the difference values (residuals) to generate a set of frequency domain coefficients and to then quantize those frequency domain coefficients, and to perform the converse process when decoding an encoded video frame.

The bitstream encoder/decoder 314 of the video processing core 300 is operable to perform an (entropy) encoding operation to encode quantized frequency domain coefficients and modes and motion vector information to provide an encoded bitstream representing an encoded video frame, and, correspondingly, to perform an (entropy) decoding process on an encoded bitstream to provide appropriate quantized frequency domain coefficients and motion vectors to allow an encoded video frame to be reconstructed.

The loop filter 316 is operable to smooth or "de-block" regions of a reconstructed source frame.

The various functional elements (circuitry) of the video processing cores 300 may comprise, for example, fixed function circuitry for performing the operation in question, or may comprise appropriately programmed programmable processing circuitry.

The operation of the multi-core video processor 208 in embodiments of the technology described herein will now be described in more detail with reference to FIGS. 4-7.

Figure 4:
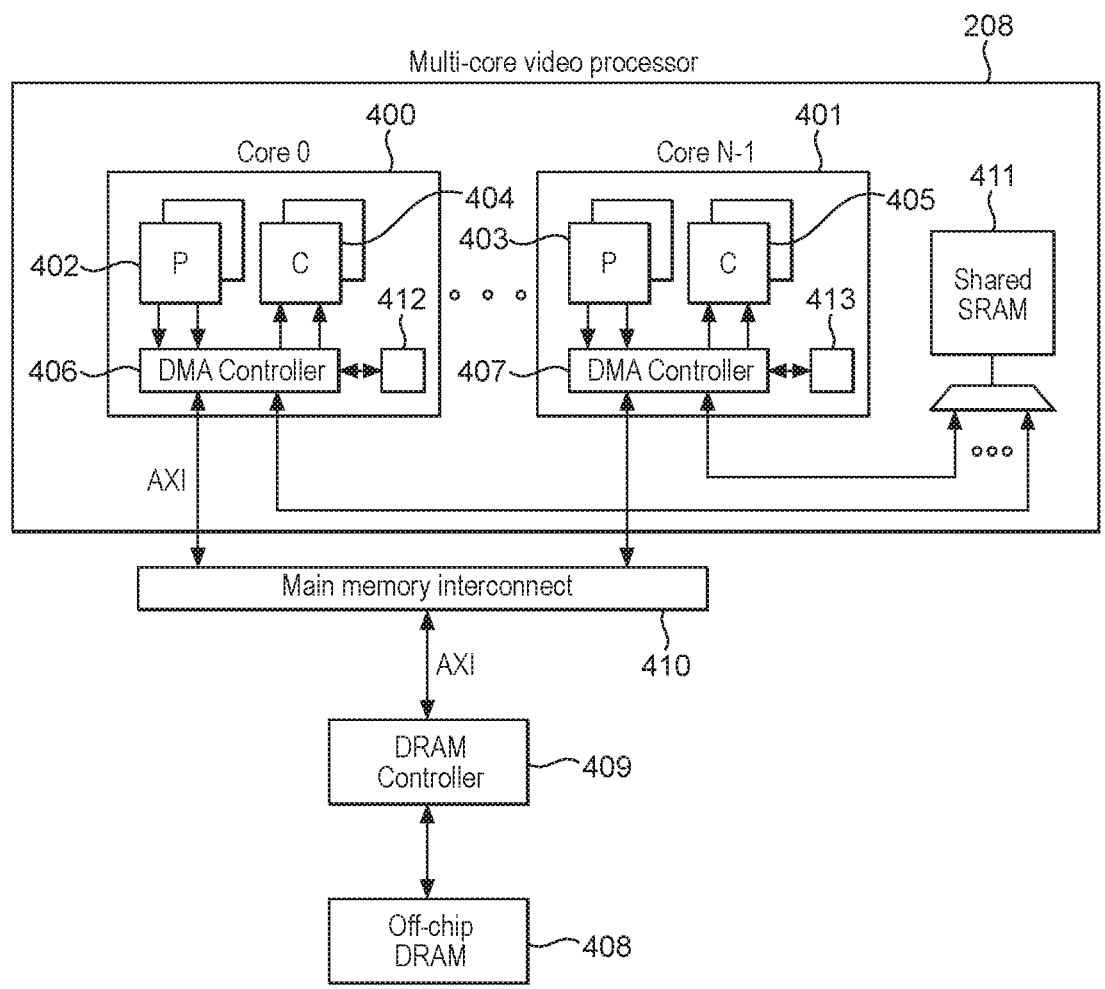
FIG. 4 shows an embodiment of the technology described herein.

FIG. 4 shows the multi-core video processor 208 schematically as including plural video processing cores 400, 401, each of which comprise respective producer processing units 402, 403, consumer processing units 404, 405 and DMA controllers 406, 407.

The producer processing units of a video processing core may comprise, for example, the bitstream encoder/decoder 314 when it is generating an encoded bitstream for output, the motion compensation circuitry 310, transform circuitry 312 and loop filter 316 when the video processing core is producing a reconstructed frame, etc. Correspondingly, the consumer processing units of a video processing core may comprise the bitstream encoder/decoder when it is decoding an encoded bitstream, and the RDO 304, intra-search 306 and motion estimation 308 circuitry when encoding a source frame. Other operations and components of the video processor cores may also act as producer and/or consumer processing units, as appropriate.

As shown in FIG. 4, the DMA controllers 406, 407 of the processing cores 400, 401 each communicate with main memory 408 (e.g. in the form of off-chip DRAM) via an appropriate memory controller (e.g. DRAM controller) 409 and a main memory (e.g. AXI) interconnect 410.

Each processing core 400, 401 also has access to shared local memory 411 (e.g. in the form of SRAM) via their respective DMA controllers.

Furthermore, the DMA controllers of each processing core also have associated with them, and access to, local storage 412, 413, where state information relating to respective DMA channels may be stored, and data for the DMA channels buffered. This will be discussed in more detail with reference to FIG. 5.

Figure 5:
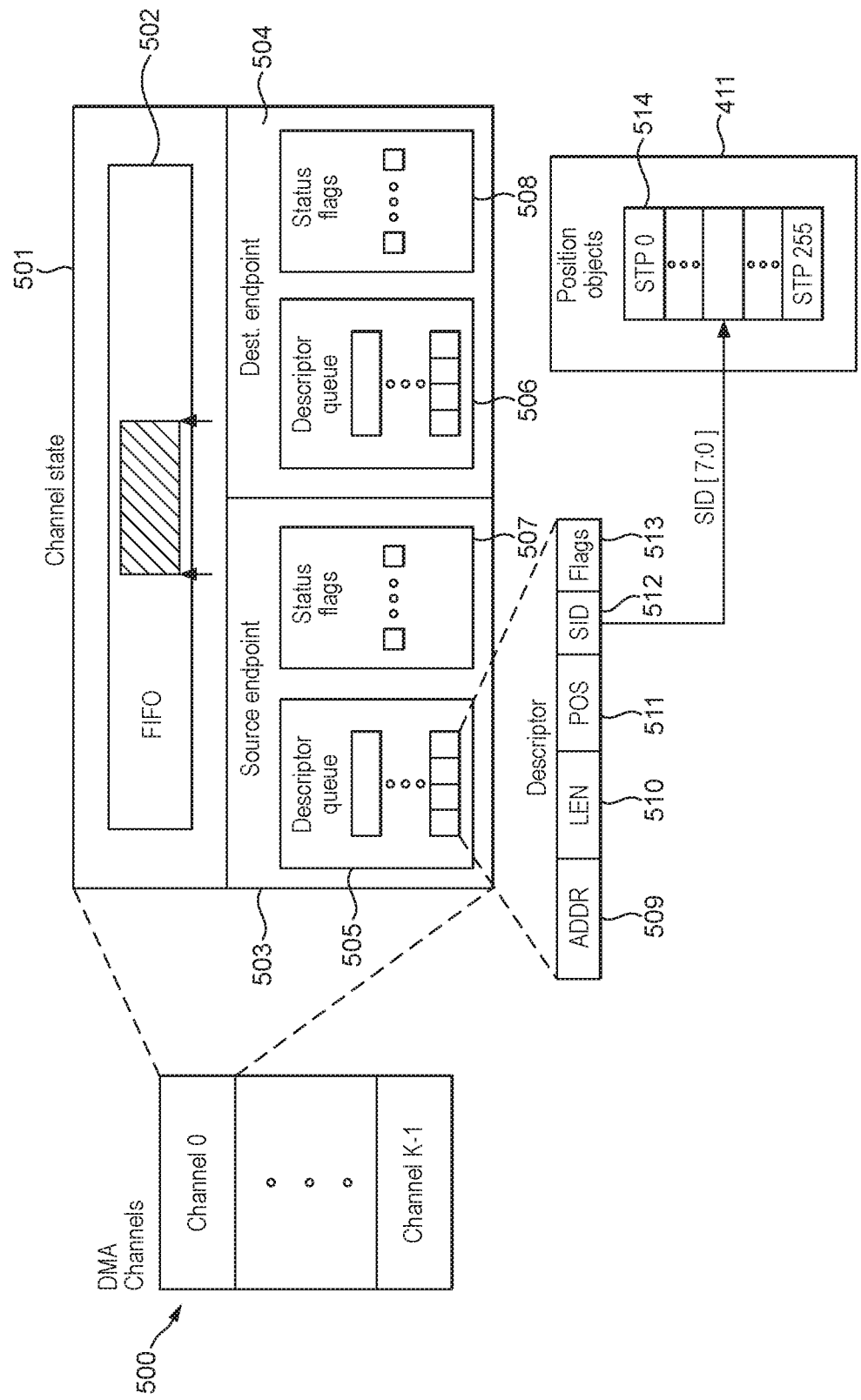
FIG. 5 shows the data structures used in an embodiment of the technology described herein.

FIG. 5 shows the data structures that are maintained by and for the processing cores 400, 401, of the multi-core video processor 208 when operating in an embodiment of the technology described herein. FIG. 5 shows both the data and data structures 501 that are maintained in the local storage of the processing core in question, and those data structures that are maintained in the shared local memory 411.

In the present embodiments, it is assumed that each processing core (and its DMA controller) can have a number of DMA channels 500 active at any one time.

As shown in FIG. 5, for each active DMA channel, a set of data and channel state information 501 is stored. This data and state information will be stored in the local storage of the respective DMA controller.

As shown in FIG. 5, the data and state information 501 for a given DMA channel includes firstly a FIFO 502 that acts to buffer data for the data stream that the DMA channel relates to (either prior to that data being written out to the external memory (where the DMA channel is being used for the purposes of producing data) or prior to that data being used (consumed) by the processing core (where the DMA channel relates to a data stream that the processing core is currently consuming)).

As shown in FIG. 5, each DMA channel has specified for it data 503 indicating a "source" endpoint for the channel (which will be the memory or device from which data for that data stream (DMA channel) is being read (received)), and data 504 indicating a destination endpoint for the channel (which correspondingly will be (and identifies) the memory or device to which data for the data stream (DMA channel) in question is being written (sent)).

As shown in FIG. 5, both the source endpoint data 503 and the destination endpoint data 504 for a DMA channel include a respective descriptor queue 505, 506, and a set of status flags 507, 508.

The descriptor queues 505, 506 comprise a queue of (source and destination) endpoint descriptors, each corresponding to a respective data stream, with the DMA channel processing the first data stream in the queue, and then proceeding to the next data stream in the descriptor queue, and so on. (Only the descriptor which is at the head of the queue is active. The next descriptor in the queue is used after the first one is completed.)

As shown in FIG. 5, a given endpoint descriptor contains a number of fields, namely: an address field (ADDR) 509 that indicates the current "endpoint" for the data stream that the descriptor relates to (which "endpoint" can be memory or a device, and thus the address field 509 can indicate a (base) memory address, or identify a device that the data is to be written to/read from); a length field (LEN) 510 that indicates the amount of data that is to be written to the memory (for a destination endpoint) or read from the memory (for a source endpoint) (e.g. in bytes); a position field (POS) 511 that tracks the position in the data stream in question that the processing unit has written data for the data stream to memory for (for a destination endpoint, i.e. when writing data to a data stream) (for a destination endpoint, the POS field is incremented after the main memory (AXI) write response has been received, so as to keep track of the amount of data that is known to have reached its destination in main memory), or has read data for the data stream from (for a source endpoint, i.e. when reading data from a data stream) (for a source endpoint, the POS field is incremented after (AXI) read data has been received from main memory, so as to keep track of the amount of data that has been read from main memory); a data stream identifier field (SID) 512 that identifies the data stream in question; and a set of flags 513.

The flags 513 include, inter alia, a "stream tracking enabled" flag that can be set to indicate that data stream tracking is enabled (i.e. that the processing unit should maintain/consult a shared position record when writing the corresponding data stream to/reading the corresponding data stream, from memory). Thus, if the data stream tracking flag is set for a source endpoint descriptor, that will indicate to the processing unit which is consuming that data stream (to its DMA controller), that it is a consumer of a "tracked" stream, and so needs to check a shared position record for that data stream appropriately when reading data for the data stream from main memory. Correspondingly, if the data stream tracking flag is set in a destination endpoint descriptor, then that will indicate to the processing unit (to its DMA controller) that is producing that data stream, that it is a producer of a "tracked" data stream, and so needs to maintain a shared position record for the data stream in question as it writes that data stream to main memory.

(If the data stream tracking flag is not set (such that the data stream tracking is not enabled) in a descriptor, then the processing unit will not maintain/consult any shared position record, and so can, e.g., operate in the conventional manner for the data stream in question.)

The set of status flags 507 for the source and destination endpoints comprise, in the present embodiments, at least the following status flags:

a "busy" flag to indicate if a main memory transfer is in progress;

a "drain" flag to indicate if the local FIFO 502 needs to be drained;

a descriptor count field to indicate how many descriptors are in the corresponding descriptor queue;

a "track" flag that can be set to indicate that a shared position record for the data stream in question needs to be written or read (respectively, depending upon whether it is a destination or source endpoint); and a request flag (REQ) that indicates that the descriptor in the queue (at the head of the queue) needs to be read.

The request flag to trigger the reading of an endpoint descriptor can be set in any appropriate and desired manner, e.g. by an appropriate operation of a producer processing unit when it has new data ready to be written to main memory, and/or via an appropriate operation when a consumer processing unit is ready to read (needs) new data from the memory. The request flag for one endpoint can be set by the other endpoint for the channel (and data stream) in question. For example, a destination endpoint can set the request flag for its corresponding source endpoint after reading out data from the FIFO 502, to indicate to the source endpoint that FIFO space is available for it to write to. A source endpoint can set the request flag for its corresponding destination endpoint when it has written new data to the FIFO 502 from main memory, to trigger the destination endpoint to commence writing that data to the destination.

FIG. 5 also shows the shared position records 514 that are maintained for respective data streams that are being processed by the video processor 208. As shown in FIG. 5, in the present embodiment these shared position records are stored in the shared, local memory 411 that is accessible to each of the processing cores of the video processor 208, and are each associated with (and thus read/written using) a corresponding data stream identifier as is used in the endpoint descriptors. This allows a respective shared position record for a given active DMA channel to be identified.

In the present embodiments, the shared record of a position in the data stream for which a producer processing unit has written data to the memory comprises an indication of how far the producer processing unit has progressed with writing the data stream relative to the start of the data stream, in the form of a data word (e.g. a 32-bit word) that indicates an offset (e.g. and in an embodiment the byte offset) into the data stream up until which data has been written to the memory.

The shared position record for a data stream may also include other, e.g. "sideband", information that, e.g. that may be useful to a consumer processing unit that is using the data stream, such as to indicate boundaries between different partitions (e.g. blocks) in a data stream.

As discussed, in the embodiments of the technology described herein, a producer processing unit can maintain for a data stream that it is producing, a record of a position in the data stream that it has written to memory. The consumer processing units that are to use the data stream then use that position record to control their reading of the data stream from the memory (e.g. to determine whether there is data available for them to read). This operation is triggered by setting the "stream tracking enabled" flag in the end point descriptors for the data stream in question.

Figure 6:
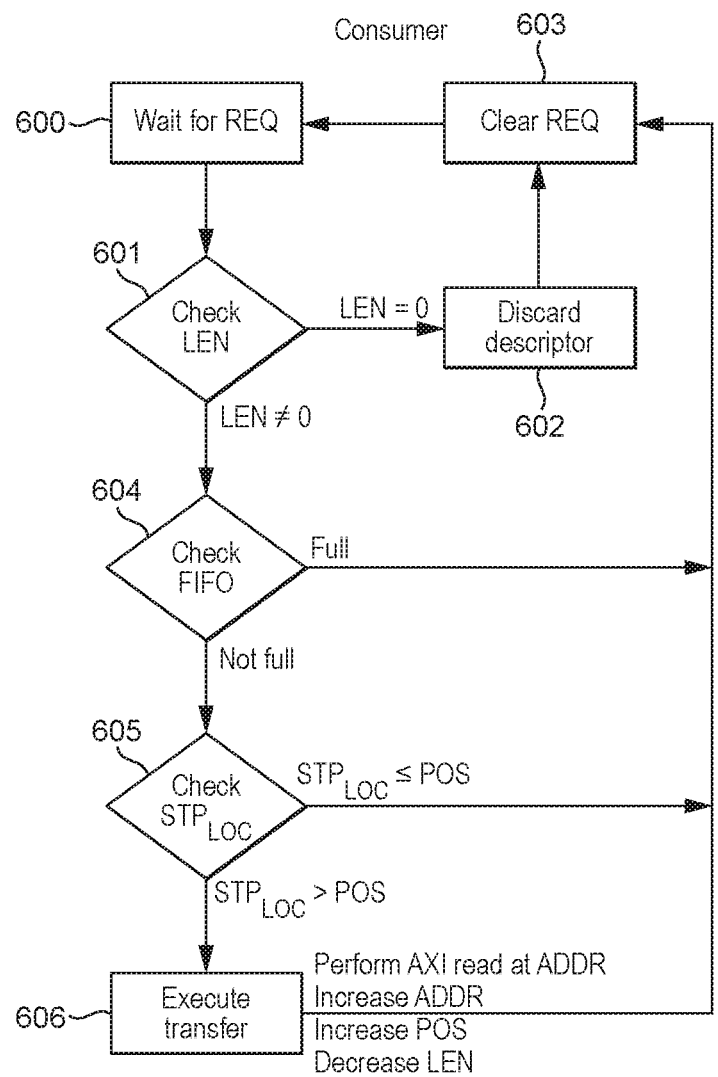
FIG. 6 shows the operation of a consumer processing unit in an embodiment of the technology described herein.
Figure 7:
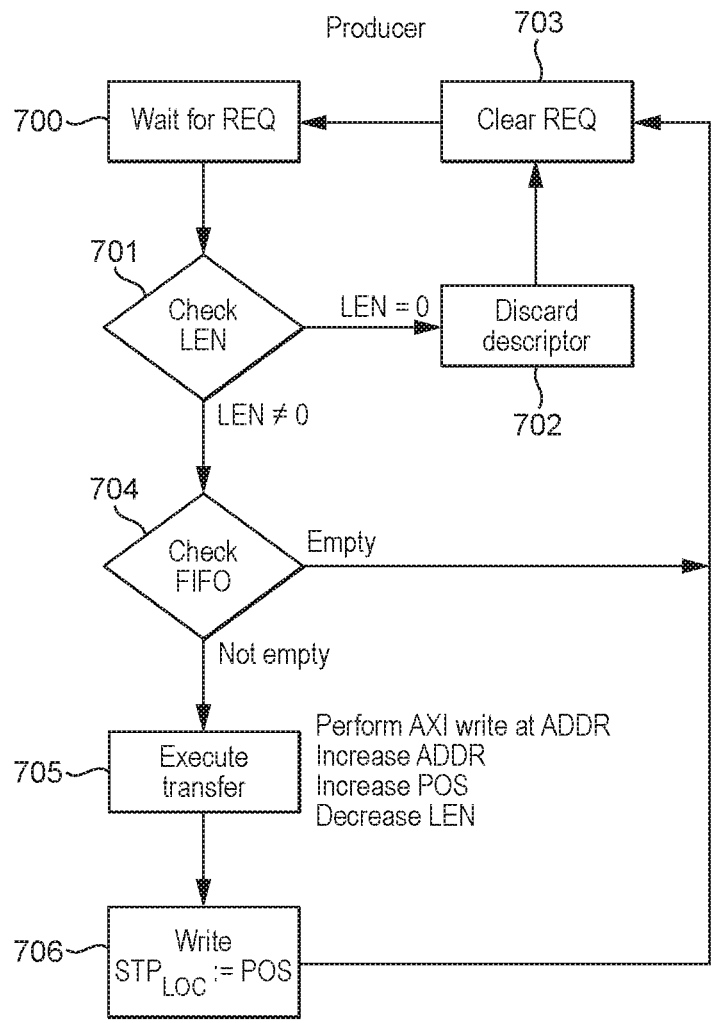
FIG. 7 shows the operation of a producer processing unit in an embodiment of the technology described herein.

FIGS. 6 and 7 illustrate this operation in embodiments of the technology described herein. FIG. 6 shows the operation of a consumer processing unit, and FIG. 7 shows the operation of a producer processing unit.

As shown in FIG. 6, the operation of a consumer processing unit attempting to read data of a "tracked" data stream from the memory will be triggered by the "request" flag REQ for a source endpoint for the DMA channel in question being set (step 600).

In response to the request REQ flag being set, the consumer processing unit (its DMA controller) will read the source endpoint descriptor at the head of the source endpoint descriptor queue for the DMA channel in question and check the length LEN field (step 601).

If the length field in the descriptor is zero (i.e. indicating that there is no more data to be read for this descriptor (thus the read "job" that the descriptor relates to has been completed (or at least all the bus transactions have been issued)—after the bus transactions also complete, the descriptor is discarded)), then the process stops and the descriptor is discarded (step 602) and the request flag is cleared (step 603)). The consumer processing unit then waits for the request flag to be set again (in response to which it will read the next descriptor in the source endpoint queue for the DMA channel in question).

On the other hand, if the length field in the descriptor does not equal zero (thereby indicating that data is still to be read from memory for the descriptor in question (the LEN field indicates how many, e.g. bytes, the consumer processing unit is tasked with reading from the memory for the data stream in question)), then the state of the buffering FIFO 502 for the DMA channel in question is checked (step 604). As shown in FIG. 6, if the FIFO is full (i.e. has no room for any new data from memory), then the process again stops and the request flag is cleared (step 603). However, in this case, the source endpoint descriptor that was read is not discarded, but is left at the head of the queue, as the read "job" (task) for that descriptor is still to be completed.

If at step 604 it is determined that the FIFO is not full, such that there is space available for new data in the FIFO, then the consumer processing unit (its DMA controller) operates to compare a current "local" write position STPLOC for the data stream in question that the consumer processing unit has determined from a shared write position record 514 for the data stream maintained by the producer processing unit that is producing the data stream, to the position POS 511 in the source endpoint descriptor that indicates the position in the data stream that the DMA channel relates to that the consumer processing unit has read up to (step 605).

As shown in FIG. 6, if this comparison indicates that the current producer processing unit data stream local write position STPLOC that the consumer processing unit is aware of is less than or equal to the data stream position POS indicated in the descriptor that has been read, then the consumer processing unit determines that it should not proceed with the read operation (as the data that it requires is not yet known to be present in the memory according to the local write position that the consumer processing unit is aware of), and so does not proceed with the read operation, but clears the request flag (and leaves the descriptor in the source endpoint descriptor queue, e.g. so that it can be tried again, e.g. once the producer processing unit has written more data for the data stream to the memory).

On the other hand, if this comparison indicates that the current producer processing unit data stream local write position STPLOC that the consumer processing unit is aware of is greater than the data stream position POS indicated in the descriptor that has been read, then the consumer processing unit determines that it can proceed with the read operation (as the data that it requires is known to be present (available) in the memory according to the local write position that the consumer processing unit is aware of), and so the consumer processing unit proceeds with the read operation to read the data of the data stream from the memory and transfer that data to the FIFO 502 for the DMA channel in question (step 606).

To do this, as shown in FIG. 6, the consumer processing unit will perform a read at the address ADDR indicated by the descriptor.

At the time the read transaction is issued, the address ADDR is increased, and the length indication LEN is decreased, by the amount of data that is being read by the read transaction (in order to track how much of the read "job" (task) that the descriptor relates to remains to be issued). Once the read (AXI) transaction is completed, the AXI interface with the DMA controller will set the REQ bit, and the position POS field will then be updated by adding to it the length of the completed read (AXI) transaction (in order to keep track of the completed (rather than just issued) read transactions).

This then allows the consumer processing unit to use a shared record of a position in a data stream for which a producer processing unit has written data to memory to control its reading of the data stream from the memory so as to avoid attempting to read data from the data stream that is at a position in the data stream that is beyond the position that the consumer processing unit knows the producer processing unit has written data to.

This operation will be performed for each DMA channel of the consumer processing unit that is "consuming" a tracked data stream.

The comparison of the current local write position STPLOC determined from a shared write position record 514 for a data stream with the current read position POS is performed by a consumer processing unit in these embodiments by the consumer processing unit subtracting its current read position POS from the write position, STP, that it last read from the shared write position record 514 maintained by the producer processing unit for the data stream in question, so as to thereby determine a "credit" "readable" amount of data for the data stream in the memory that can (safely) be read by the consumer processing unit.

If this "credit" readable amount of data is greater than zero, then the consumer processing unit proceeds with reading the data (and vice-versa).

(The available "credit" amount of data is set to zero initially, and then updated once the appropriate shared write position record for the data stream has been read.)

The consumer processing unit keeps track of how much data is available for it to read by periodically reading the shared write position record 514 for the data stream that is being maintained by the producer processing unit, and updating its "credit" available amount of data (its local record of the write position that has currently been reached for the data stream) accordingly.

In particular, when the consumer processing unit determines that the available "credit" amount of data for a data stream has fallen below a threshold amount, it sets the "track" flag that is associated with the source endpoints descriptors for the DMA channel in question, so as to indicate that an update from the shared write position record 514 being maintained in the shared local memory 411 by the producer processing unit that is the destination endpoint for the DMA channel in question is required for the data stream in question.

The consumer processing unit performs a regular "update" ("maintenance") cycle, e.g. every few thousand (e.g. every 2000) clock cycles, to determine if there are any shared write position records for any data streams that it is using that should be updated (for which the update, "track", flag is set), and, if so, reads the shared write position record 514 (and updates the "credit" amount of data that it can read from the memory) for the indicated data stream(s).

This is done for each "tracked" data stream that the consumer processing unit is currently reading.

(Thus, a consumer processing unit will periodically (e.g. every few thousand clock cycles) check its local data stream position records, and for each local data stream position record that is indicated as needing to be updated, will read the shared write position record for that data stream (and update its local position record for that data stream accordingly). This process is then repeated on the next "maintenance" cycle, and so on.)

In the present embodiments, the shared write position records are read by the DMA controllers of the consumer processing units, and the DMA controllers also maintain the local "credit" amount of available data records.

FIG. 7 shows the corresponding operation of a producer processing unit when producing and storing a "tracked" data stream in the memory.

As shown in FIG. 7, the operation of a producer processing unit writing data of a "tracked" data stream to the memory will be triggered by the "request" flag REQ for a destination endpoint for the DMA channel in question being set (step 700).

In response to the request flag being set, the producer processing unit (its DMA controller) will read the destination endpoint descriptor at the head of the destination endpoint descriptor queue for the DMA channel in question and check the length LEN field (step 701).

If the length field in the descriptor is zero (i.e. indicating that there is no more data to be written for this descriptor (thus the write "job" that the descriptor relates to has been completed (or at least all the bus transactions have been issued)—after the bus transactions also complete, the descriptor is discarded), then the process stops and the descriptor is discarded (step 702) and the request flag is cleared (step 703)). The producer processing unit then waits for the request flag to be set again (in response to which it will read the next descriptor in the destination endpoint queue for the DMA channel in question).

On the other hand, if the length field in the descriptor does not equal zero (thereby indicating that data is still to be written to memory for the descriptor in question (the LEN field indicates how many, e.g. bytes, the consumer processing unit is tasked with writing to the memory for the data stream in question)), then the state of the buffering FIFO 502 for the DMA channel in question is checked (step 704).

As shown in FIG. 7, if the FIFO is empty (i.e. has no data for writing to memory), then the process again stops and the request flag is cleared (step 703). However, in this case, the destination endpoint descriptor that was read is not discarded, but is left at the head of the queue, as the write "job" (task) for that descriptor is still to be completed.

If at step 704 it is determined that the FIFO is not empty, such that there is data in the FIFO for writing to memory, then the producer processing unit (its DMA controller) determines that it can proceed with the write operation (as the data that is to be written to the memory is present in the FIFO), and so the producer processing unit proceeds with the write operation to write the data of the data stream from the FIFO 502 for the DMA channel in question to the memory (step 705).

To do this, as shown in FIG. 7, the producer processing unit will perform a memory write at the address ADDR indicated by the descriptor.

At the time the write transaction is issued, the address ADDR is increased, and the length indication LEN is decreased, by the amount of data that is being written by the write transaction (in order to track how much of the write "job" (task) that the descriptor relates to remains to be issued). Once the write (AXI) transaction is completed, the AXI interface with the DMA controller will set the REQ bit, and the position POS field will then be updated by adding to it the length of the completed write (AXI) transaction (in order to keep track of the completed (rather than just issued) write transactions).

(The write operation determination at step 704 could also determine if the FIFO contains enough data for a "full" memory transaction (burst) and defer any writing of data until a full transaction (burst) can be written, if desired.)

As well as writing the data to the memory, the producer processing unit also updates a local current write position record STPLOC for the data stream in question that the producer processing unit is maintaining to the position POS 511 in the destination endpoint descriptor that indicates the position in the data stream that the DMA channel relates to that the producer processing unit has written to the memory (step 706). As will be discussed further below, this local write position record is then periodically written to the shared write position record 514 for the data stream in question for the consumer processing units that are consuming the data stream to use.

This operation will be performed for each DMA channel of the producer processing unit that is "producing" a tracked data stream.

To trigger the producer processing unit updating a shared write position record 514 for a data stream that is being maintained by the producer processing unit, the producer processing unit sets the "track" flag that is associated with the destination endpoints descriptors for the DMA channel in question when it has written new data to memory and updated its local write position record STPLOC, so as to indicate that an update to the shared write position record 514 being maintained in the shared local memory 411 by the producer processing unit that is the destination endpoint for the DMA channel in question is required for the data stream in question.

The producer processing unit performs a regular "update" ("maintenance") cycle, e.g. every few thousand (e.g. every 2000) clock cycles, to determine if there are any shared write position records for any data streams that it is using that should be updated (for which the update, "track", flag is set), and, if so, reads its local write position record and updates the shared write position record 514 for the indicated data stream(s) accordingly.

This is done for each "tracked" data stream that the producer processing unit is currently producing.

(Thus, a producer processing unit will periodically (e.g. every few thousand clock cycles) check its local data stream position records, and for each local data stream position record that is indicated as needing to be updated, will update the shared write position record for that data stream accordingly. This process is then repeated on the next "maintenance" cycle, and so on.)

In the present embodiments, the shared write position records are updated by the DMA controllers of the producer processing units, and the DMA controllers also maintain the local data stream write position records.

A number of variations, modifications and alternatives to the above described embodiments of the technology described herein would be possible, if desired.

For example, although the above embodiments have been described with reference to the tracking of a write position in a data stream that a producer processing unit is producing, so as to allow consumer processing unit(s) that are to read the data stream to avoid attempting to read data that has not yet been written to the memory for the data stream (i.e. to in effect, track "write-after-read" hazards), the principles of the present embodiments could equally be used to track "read-after-write" hazards, i.e. to ensure that data for a data stream that is stored in a memory is not overwritten until that data has been read by a consumer processing unit that needs it.

In this case, the operation of the present embodiments would be used to maintain a shared read position record, with a given producer processing unit that is writing new data to the memory then using the shared read position information to (try to) ensure that it does not overwrite data in the memory until that data has been read.

Such an arrangement could then be used to free up memory in a more controlled way so that it can be re-written safely after the existing data in the memory has been read.

Similarly, the principles of the present embodiments could equally be used to track "write-after-write" hazards, i.e. to ensure that a given, particular, set of data is written before another given, particular set of data is written to the memory. This may be desirable, for example, where it is desired to try to make sure that certain data (e.g. blocks of payload data) is or are written to memory before other, e.g. related, data (such as a corresponding header (e.g. metadata) for the payload data) is written to the memory (so as to then (try to) ensure that it will be safe to read the e.g. payload, data once the corresponding e.g. header (e.g. metadata), has been seen).

In this case, the operation of the present embodiments would be used to keep track of a shared write position in the memory, but with a given producer processing unit that is writing new data to the memory then using the shared write position information to (try to) ensure that it does not write certain data to the memory until particular data for the data stream has been written to the memory (e.g. a particular position in the data stream has been written to the memory).

The present embodiments can be used in any desired and suitable data processing system in which a "producing" processing unit will generate and store data streams for use by one or more "consuming" processing units. Thus, as well as video processing systems, the present embodiments can also be used in other data processing systems, such as image processing systems, and graphic processing systems.

As can be seen from the above, the technology described herein, in its embodiments at least, provides an improved mechanism for synchronising the operation of a producer and consumer processing units when producing and consuming a data stream. This is achieved, in embodiments of the technology described herein at least, by a producer processing unit maintaining a record of a current position in the data stream that the producer processing unit has written, and consumer processing units that are consuming the data stream then using that write position record to control their reading of the data stream.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system in which one or more producer processing units of the data processing system are operable to produce plural data streams and store the plural data streams in a same memory, and one or more consumer processing units of the data processing system are operable to read the plural data streams produced by the one or more producer processing units from the memory for use, the method comprising:
  a first producer processing unit of the one or more producer processing units producing a first data stream of the plural data streams and storing the first data stream in the memory, wherein the first producer processing unit comprises a first producer memory controller and a first producer buffer for the first producer memory controller, and wherein the first producer processing unit storing the first data stream in the memory comprises the first producer memory controller transferring data of the first data stream from the first producer buffer to the memory;
  a first consumer processing unit of the one or more consumer processing units reading the first data stream from the memory and using the first data stream, wherein the first consumer processing unit comprises a first consumer memory controller and a first consumer buffer for the first consumer memory controller, and wherein the first consumer processing unit reading the first data stream from the memory comprises the first consumer memory controller transferring data of the first data stream from the memory to the first consumer buffer;
  a second producer processing unit of the one or more producer processing units producing a second data stream of the plural data streams and storing the second data stream in the memory, wherein the second producer processing unit comprises a second producer memory controller and a second producer buffer for the second producer memory controller, and wherein the second producer processing unit storing the second data stream in the memory comprises the second producer memory controller transferring data of the second data stream from the second producer buffer to the memory; and
  a second consumer processing unit of the one or more consumer processing units reading the second data stream from the memory and using the second data stream, wherein the second consumer processing unit comprises a second consumer memory controller and a second consumer buffer for the second consumer memory controller, and wherein the second consumer processing unit reading the first data stream from the memory comprises the second consumer memory controller transferring data of the second data stream from the memory to the second consumer buffer;
the method further comprising:
  the first producer processing unit, as it is producing the first data stream, maintaining a first data stream first write position record that is accessible to the first consumer processing unit that is reading the first data stream from the memory, wherein the first data stream first write position record is a record of a write position for the first data stream and the write position for the first data stream is a position in the first data stream for which the first producer processing unit has written data of that first data stream to the memory from the first producer buffer;
  the second producer processing unit, as it is producing the second data stream, maintaining a second data stream first write position record that is accessible to the second consumer processing unit that is reading the second data stream from the memory, wherein the second data stream first write position record is a record of a write position for the second data stream and the write position for the second data stream is a position in the second data stream for which the second producer processing unit has written data of that second data stream to the memory from the second producer buffer;
  the first consumer processing unit that is reading the first data stream from the memory:
    monitoring the first data stream first write position record maintained by the first producer processing unit; and
    controlling its reading of the first data stream from the memory in accordance with the first data stream first write position record maintained by the first producer processing unit, wherein the first consumer processing unit can use the first data stream first write position record to determine the write position for the first data stream regardless of the amount of data of the second data stream that has been written to the memory that stores the first data stream and the second data stream, and wherein the first consumer processing unit controlling its reading of the first data stream from the memory in accordance with the first data stream first write position record maintained by the first producer processing unit comprises the first consumer memory controller determining whether to request data of the first data stream to be transferred from the memory to the first consumer buffer based on the first data stream first write position record maintained by the first producer processing unit; and
  the second consumer processing unit that is reading the second data stream from the memory:
    monitoring the second data stream first write position record maintained by the second producer processing unit; and
    controlling its reading of the second data stream from the memory in accordance with the second data stream first write position record maintained by the second producer processing unit, wherein the second consumer processing unit can use the second data stream first write position record to determine the write position for the second data stream regardless of the amount of data of the first data stream that has been written to the memory that stores the first data stream and the second data stream, and wherein the second consumer processing unit controlling its reading of the second data stream from the memory in accordance with the second data stream first write position record maintained by the second producer processing unit comprises the second consumer memory controller determining whether to request data of the second data stream to be transferred from the memory to the second consumer buffer based on the second data stream first write position record maintained by the second producer processing unit;

wherein:

the first data stream and the second data stream are different data streams that are written to the same memory;

the first consumer processing unit and the second consumer processing are the same consumer processing unit or are different consumer processing units; and the first producer processing unit and the second producer processing unit are the same producer processing unit or are different producer processing units.

2. The method of claim 1, wherein the one or more consumer processing units are plural consumer processing units and the method comprises:

at least two consumer processing units of the plural consumer processing units:

reading the first data stream from the memory;

monitoring the first data stream first write position record maintained by the first producer processing unit; and controlling their reading of the first data stream from the memory in accordance with the first data stream first write position record maintained by the first producer processing unit.

3. The method of claim 1, wherein the first data stream first write position record indicates a relative position in the first data stream that the first producer processing unit has written to the memory, relative to the start of the first data stream.

4. The method of claim 1, wherein the first data stream first write position record is maintained in the same memory as the first data stream.

5. The method of claim 1, wherein the first data stream first write position record also includes other information, in addition to the write position for the first data stream.

6. The method of claim 1, further comprising:

the first producer processing unit, as it is producing the first data stream and storing the first data stream in the memory:

maintaining a first data stream second write position record that is a local record of the write position for the first data stream; and periodically updating the first data stream first write position record that is accessible to the first consumer processing unit based on the first data stream second write position record.

7. The method of claim 1, further comprising the first consumer processing unit that is reading the first data stream from the memory:

comparing a read position that is a position in the first data stream that it has read up to, to the write position for the first data stream that it has read from the first data stream first write position record maintained by the first producer processing unit, so as to determine an amount of available data that is an available amount of data that is stored in the memory that the first consumer processing unit can read up to; and tracking its reading of that determined amount of available data, so as to control its reading of the first data stream from the memory in accordance with the first data stream first write position record maintained by the first producer processing unit.

8. The method of claim 7, further comprising the first consumer processing unit:

in response to a remaining amount of the determined amount of available data for the first consumer processing unit to read up to falling below a threshold amount, reading the first write position record maintained by the first producer processing unit again, so as to determine an updated available amount of data that is stored in the memory that the first consumer processing unit can read up to.

9. The method of claim 1, further comprising:

the first consumer processing unit, as it is reading the first data stream, maintaining a read position record that is accessible to the first producer processing unit that is storing the first data stream in the memory, wherein the read position record is a record of a read position and the read position is a position in the first data stream for which the first consumer processing unit has read data of that first data stream from the memory; and the first producer processing unit that is storing the first data stream in the memory:

monitoring the read position record maintained by the first consumer processing unit; and controlling its writing of the first data stream to the memory in accordance with the read position record maintained by the first consumer processing unit.

10. The method of claim 1, further comprising:

a third producer processing unit of the one or more producer processing units that is producing data and storing the data in the memory:

monitoring the first data stream first write position record maintained by the first producer processing unit that is producing the first data stream and storing the first data stream in the memory; and controlling its writing of the data to the memory in accordance with the first data stream first write position record maintained by the first producer processing unit that is producing the first data stream and storing the first data stream in the memory.

11. The method of claim 1, wherein the first data stream is a stream of video data.

12. A method of operating a data processing system in which one or more producer processing units of the data processing system are operable to produce plural data streams, and to store the plural data streams in a same memory, and one or more consumer processing units are operable to read the plural data streams produced by the one or more producer processing units from the memory for use, the method comprising:

a first producer processing unit of the one or more producer processing units producing a first data stream of the plural data streams and storing the first data stream in memory, wherein the first producer processing unit comprises a first producer memory controller and a first producer buffer for the first producer memory controller, and wherein the first producer processing unit storing the first data stream in the memory comprises the first producer memory controller transferring data of the first data stream from the first producer buffer to the memory;

a first consumer processing unit of the one or more consumer processing units reading a second data stream of the plural data streams from the memory for use, wherein the first consumer processing unit comprises a first consumer memory controller and a first consumer buffer for the first consumer memory controller, and wherein the first consumer processing unit reading the second data stream from the memory comprises the first consumer memory controller transferring data of the second data stream from the memory to the first consumer buffer; and a second consumer processing unit of the one or more consumer processing units reading a third data stream of the plural data streams from the memory for use, wherein the second consumer processing unit comprises a second consumer memory controller and a second consumer buffer for the second consumer memory controller, and wherein the second consumer processing unit reading the third data stream from the memory comprises the second consumer memory controller transferring data of the third data stream from the memory to the second consumer buffer;

the method further comprising:
the first consumer processing unit, as it is reading the second data stream, maintaining a read position record that is accessible to the first producer processing unit that is storing the first data stream in the memory, wherein the read position record is a record of a read position for the second data stream and the read position is a position in the second data stream for which the first consumer processing unit has read data of the second data stream from the memory; and the first producer processing unit that is storing the first data stream in the memory:
monitoring the read position record maintained by the first consumer processing unit; and
controlling its writing of the first data stream to the memory in accordance with the read position record maintained by the first consumer processing unit, wherein the first producer processing unit can use the read position record to determine the read position for the second data stream regardless of the amount of data of the third data stream that has been read from the memory that stores the second data stream and the third data stream, and wherein the first producer processing unit controlling its writing of the first data stream to the memory in accordance with the read position record maintained by the first consumer processing unit comprises the first producer memory controller determining whether to request data of the first data stream to be transferred from the first producer buffer to the memory based on the read position record maintained by the first consumer processing unit;

wherein:
the second data stream and the third data stream are different data streams read from the same memory;
the first data stream, the second data stream and the third data stream are all different data streams, or the first data stream is the same data stream as one of the second data stream and the third data stream; and the first consumer processing unit and the second consumer processing unit are the same consumer processing unit or are different consumer processing units.

13. A data processing system comprising:
one or more producer processing units operable to produce plural data streams;
one or more consumer processing units operable to use the plural data streams produced by the one or more producer processing units; and
a same memory storing the plural data streams produced by the one or more producer processing units;
wherein:
a first producer processing unit of the one or more producer processing units comprises: a first producer processing circuit operable to produce a first data stream of the plural data streams; a first producer memory controller; and a first producer buffer for the first producer memory controller, wherein the first producer processing unit is operable to store the first data stream in the memory by the first producer memory controller transferring data of the first data stream from the first producer buffer to the memory;
a first consumer processing unit of the one or more consumer processing units comprises: a first consumer processing circuit operable to use the first data stream; a first consumer memory controller; and a first consumer buffer for the first consumer memory controller, wherein the first consumer processing unit is operable to read the first data stream from the memory by the first consumer memory controller transferring data of the first data stream from the memory to the first consumer buffer;
a second producer processing unit of the one or more producer processing units comprises: a second producer processing circuit operable to produce a second data stream of the plural data streams; a second producer memory controller; and a second producer buffer for the second producer memory controller, wherein the second producer processing unit is operable to store the second data stream in the memory by the second producer memory controller transferring data of the second data stream from the second producer buffer to the memory; and
a second consumer processing unit of the one or more consumer processing units comprises: a second consumer processing circuit operable to use the second data stream; a second consumer memory controller; and a second consumer buffer for the second consumer memory controller, wherein the second consumer processing unit is operable to read the second data stream from the memory by the second consumer memory controller transferring data of the second data stream from the memory to the second consumer buffer;
and wherein:
the first producer processing unit is operable to, as it is producing the first data stream, maintain a first data stream first write position record that is accessible to the first consumer processing unit that is reading the first data stream from the memory, wherein the first data stream first write position record is a record of a write position for the first data stream and the write position for the first data stream is a position in the first data stream for which the first producer processing unit has written data of that first data stream to the memory from the first producer buffer;

the second producer processing unit is operable to, as it is producing the second data stream, maintain a second data stream first write position record that is accessible to the second consumer processing unit that is reading the second data stream from the memory, wherein the second data stream first write position record is a record of a write position for the second data stream and the write position for the second data stream is a position in the second data stream for which the second producer processing unit has written data of that second data stream to the memory from the second producer buffer; and the first consumer processing unit is operable to:
monitor the first data stream first write position record maintained by the first producer processing unit; and
control its reading of the first data stream from the memory in accordance with the first data stream first write position record maintained by the first producer processing unit, wherein the first consumer processing unit can use the first data stream first write position record to determine the write position for the first data stream regardless of the amount of data of the second data stream that has been written to the memory that stores the first data stream and the second data stream, and wherein the first consumer processing unit is operable to control its reading of the first data stream from the memory in accordance with the first data stream first write position record maintained by the first producer processing unit by the first consumer memory controller determining whether to request data of the first data stream to be transferred from the memory to the first consumer buffer based on the first data stream first write position record maintained by the first producer processing unit; and the second consumer processing unit is operable to:
monitor the second data stream first write position record maintained by the second producer processing unit; and
control its reading of the second data stream from the memory in accordance with the second data stream first write position record maintained by the second producer processing unit, wherein the second consumer processing unit can use the second data stream first write position record to determine the write position for the second data stream regardless of the amount of data of the first data stream that has been written to the memory that stores the first data stream and the second data stream, and wherein the second consumer processing unit is operable to control its reading of the second data stream from the memory in accordance with the second data stream first write position record maintained by the second producer processing unit by the second consumer memory controller determining whether to request data of the second data stream to be transferred from the memory to the second consumer buffer based on the second data stream first write position record maintained by the second producer processing unit;

wherein:
the first data stream and the second data stream are different data streams that are written to the same memory;
the first consumer processing unit and the second consumer processing are the same consumer processing unit or are different consumer processing units; and
the first producer processing unit and the second producer processing unit are the same producer processing unit or are different producer processing units.

14. The system of claim 13, wherein the first producer processing unit is configured to:
as it is producing the first data stream and storing the first data stream in memory:
maintain a first data stream second write position record that is a local record of the write position for the first data stream; and
periodically update the first data stream first write position record that is accessible to the first consumer processing unit based on the first data stream second write position record.

15. The system of claim 13, wherein the first consumer processing unit is configured to:
when reading the first data stream from the memory:
compare a read position that is a position in the first data stream that it has read up to, to the write position for the first data stream that it has read from the first data stream first write position record maintained by the first producer processing unit that is writing the first data stream to the memory, so as to determine an amount of available data that is the available amount of data that is stored in the memory that the first consumer processing unit can read up to; and
track its reading of that determined amount of available data, so as to control its reading of the first data stream from the memory in accordance with the first data stream first write position record maintained by the first producer processing unit.

16. The system of claim 15, wherein the first consumer processing unit is further configured to:
in response to a remaining amount of the determined amount of available data for the first consumer processing unit to read up to falling below a threshold amount, read the first data stream first write position record maintained by the first producer processing unit again, so as to determine an updated available amount of data that is stored in the memory that the first consumer processing unit can read up to.

17. The system of claim 13, wherein:
the first consumer processing unit is configured to:
as the first consumer processing unit is reading the first data stream, maintain a read position record that is accessible to the first producer processing unit that is storing the first data stream in the memory, wherein the read position record is a record of a read position and the read position is a position in the first data stream for which the first consumer processing unit has read data of that first data stream from the memory; and
the first producer processing unit is configured to:
monitor the read position record maintained by the first consumer processing unit; and
control its writing of the first data stream to the memory in accordance with the read position record maintained by the first consumer processing unit.

18. The system of claim 13, comprising:
a third producer processing unit of the one or more producer processing units operable to produce data and store the data in the memory, the third producer processing unit comprising a third producer processing circuit configured to:
monitor the first data stream first write position record maintained by the first producer processing unit that is producing the first data stream and storing the first data stream in the memory; and control its writing of the data to the memory in accordance with the first data stream first write position record maintained by the first producer processing unit that is producing the first data stream and storing the first data stream in the memory.

19. A data processing system comprising:
one or more producer processing units operable to produce plural data streams;
one or more consumer processing units operable to use the plural data streams produced by the one or more producer processing units; and
a same memory storing the plural data streams produced by the one or more producer processing units;
wherein:
a first producer processing unit of the one or more producer processing units comprises: a first producer processing circuit operable to produce a first data stream; a first producer memory controller; and a first producer buffer for the first producer memory controller, wherein the first producer processing unit is operable to store the first data stream in the memory by the first producer memory controller transferring data of the first data stream from the first producer buffer to the memory;
a first consumer processing unit of the one or more consumer processing units comprises: a first consumer processing circuit operable to use a second data stream; a first consumer memory controller; and a first consumer buffer for the first consumer memory controller, wherein the first consumer processing unit is operable to read the second data stream from the memory by the first consumer memory controller transferring data of the second data stream from the memory to the first consumer buffer; and
a second consumer processing unit of the one or more consumer processing units comprises: a second consumer processing circuit operable to use a third data stream; a second consumer memory controller; and a second consumer buffer for the second consumer memory controller, wherein the second consumer processing unit is operable to read the third data stream from the memory by the second consumer memory controller transferring data of the third data stream from the memory to the second consumer buffer;
and wherein:
the first consumer processing unit is operable to, as it is reading the second data stream, maintain a read position record that is accessible to the first producer processing unit that is writing the first data stream to the memory, wherein the read position record is a record of a read position for the second data stream and the read position is a position in the second data stream for which the first consumer processing unit has read data of the second data stream from the memory; and
the first producer processing unit is operable to:
monitor the read position record maintained by the first consumer processing unit; and
control its writing of the first data stream to the memory in accordance with the read position record maintained by the first consumer processing unit, wherein the first producer processing unit can use the read position record to determine the read position for the second data stream regardless of the amount of data of the third data stream that has been read from the memory that stores the second data stream and the third data stream; and wherein the first producer processing unit is operable to control its writing of the first data stream to the memory in accordance with the read position record maintained by the first consumer processing unit by the first producer memory controller determining whether to request data of the first data stream to be transferred from the first producer buffer to the memory based on the read position record maintained by the first consumer processing unit;
wherein:
the second data stream and the third data stream are different data streams read from the same memory;
the first data stream, the second data stream and the third data stream are all different data streams or the first data stream is the same data stream as one of the second data stream and the third data stream; and
the first consumer processing unit and the second consumer processing unit are the same consumer processing unit or are different consumer processing units.

20. A non-transitory computer readable storage medium storing computer software code which when executed on a data processor performs a method of operating a data processing system in which one or more producer processing units of the data processing system are operable to produce plural data streams and store the plural data streams in a same memory, and one or more consumer processing units of the data processing system are operable to read the plural data streams produced by the one or more producer processing units from the memory for use, the method comprising:
a first producer processing unit of the one or more producer processing units producing a first data stream of the plural data streams and storing the first data stream in the memory, wherein the first producer processing unit comprises a first producer memory controller and a first producer buffer for the first producer memory controller, and wherein the first producer processing unit storing the first data stream in the memory comprises the first producer memory controller transferring data of the first data stream from the first producer buffer to the memory;
a first consumer processing unit of the one or more consumer processing units reading the first data stream from the memory and using the first data stream, wherein the first consumer processing unit comprises a first consumer memory controller and a first consumer buffer for the first consumer memory controller, and wherein the first consumer processing unit reading the first data stream from the memory comprises the first consumer memory controller transferring data of the first data stream from the memory to the first consumer buffer;
a second producer processing unit of the one or more producer processing units producing a second data stream of the plural data streams and storing the second data stream in the memory, wherein the second producer processing unit comprises a second producer memory controller and a second producer buffer for the second producer memory controller, and wherein the second producer processing unit storing the second data stream in the memory comprises the second producer memory controller transferring data of the second data stream from the second producer buffer to the memory; and
a second consumer processing unit of the one or more consumer processing units reading the second data stream from the memory and using the second data stream, wherein the second consumer processing unit comprises a second consumer memory controller and a second consumer buffer for the second consumer memory controller, and wherein the second consumer processing unit reading the first data stream from the memory comprises the second consumer memory controller transferring data of the second data stream from the memory to the second consumer buffer;

the method further comprising:
the first producer processing unit, as it is producing the first data stream, maintaining a first data stream first write position record that is accessible to the first consumer processing unit that is reading the first data stream from the memory, wherein the first data stream first write position record is a record of a write position for the first data stream and the write position for the first data stream is a position in the first data stream for which the first producer processing unit has written data of that first data stream to the memory from the first producer buffer;

the second producer processing unit, as it is producing the second data stream, maintaining a second data stream first write position record that is accessible to the second consumer processing unit that is reading the second data stream from the memory, wherein the second data stream first write position record is a record of a write position for the second data stream and the write position for the second data stream is a position in the second data stream for which the second producer processing unit has written data of that second data stream to the memory from the second producer buffer;

the first consumer processing unit that is reading the first data stream from the memory:
monitoring the first data stream first write position record maintained by the first producer processing unit; and
controlling its reading of the first data stream from the memory in accordance with the first data stream first write position record maintained by the first producer processing unit, wherein the first consumer processing unit can use the first data stream first write position record to determine the write position for the first data stream regardless of the amount of data of the second data stream that has been written to the memory that stores the first data stream and the second data stream, and wherein the first consumer processing unit controlling its reading of the first data stream from the memory in accordance with the first data stream first write position record maintained by the first producer processing unit comprises the first consumer memory controller determining whether to request data of the first data stream to be transferred from the memory to the first consumer buffer based on the first data stream first write position record maintained by the first producer processing unit; and the second consumer processing unit that is reading the second data stream from the memory:
monitoring the second data stream first write position record maintained by the second producer processing unit; and
controlling its reading of the second data stream from the memory in accordance with the second data stream first write position record maintained by the second producer processing unit, wherein the second consumer processing unit can use the second data stream first write position record to determine the write position for the second data stream regardless of the amount of data of the first data stream that has been written to the memory that stores the first data stream and the second data stream, and wherein the second consumer processing unit controlling its reading of the second data stream from the memory in accordance with the second data stream first write position record maintained by the second producer processing unit comprises the second consumer memory controller determining whether to request data of the second data stream to be transferred from the memory to the second consumer buffer based on the second data stream first write position record maintained by the second producer processing unit;

wherein:
the first data stream and the second data stream are different data streams that are written to the same memory;
the first consumer processing unit and the second consumer processing are the same consumer processing unit or are different consumer processing units; and
the first producer processing unit and the second producer processing unit are the same producer processing unit or are different producer processing units.

21. A non-transitory computer readable storage medium storing computer software code which when executed on a data processor performs a method of operating a data processing system in which one or more producer processing units of the data processing system are operable to produce plural data streams, and to store the plural data streams in a same memory, and one or more consumer processing units are operable to read the plural data streams produced by the one or more producer processing units from the memory for use, the method comprising:

a first producer processing unit of the one or more producer processing units producing a first data stream of the plural data streams and storing the first data stream in the memory, wherein the first producer processing unit comprises a first producer memory controller and a first producer buffer for the first producer memory controller, and wherein the first producer processing unit storing the first data stream in the memory comprises the first producer memory controller transferring data of the first data stream from the first producer buffer to the memory; and a first consumer processing unit of the one or more consumer processing units reading a second data stream of the plural data streams from the memory for use, wherein the first consumer processing unit comprises a first consumer memory controller and a first consumer buffer for the first consumer memory controller, and wherein the first consumer processing unit reading the second data stream from the memory comprises the first consumer memory controller transferring data of the second data stream from the memory to the first consumer buffer; and a second consumer processing unit of the one or more consumer processing units reading a third data stream of the plural data streams from the memory for use, wherein the second consumer processing unit comprises a second consumer memory controller and a second consumer buffer for the second consumer memory controller, and wherein the second consumer processing unit reading the third data stream from the memory comprises the second consumer memory controller transferring data of the third data stream from the memory to the second consumer buffer;

the method further comprising:

the first consumer processing unit, as it is reading the second data stream, maintaining a read position record that is accessible to the first producer processing unit that is storing the first data stream in the memory, wherein the read position record is a record of a read position for the second data stream and the read position is a position in the second data stream for which the first consumer processing unit has read data of the second data stream from the memory; and the first producer processing unit that is storing the first data stream in the memory:

monitoring the read position record maintained by the first consumer processing unit; and controlling its writing of the first data stream to the memory in accordance with the read position record maintained by the first consumer processing unit, wherein the first producer processing unit can use the read position record to determine the read position for the second data stream regardless of the amount of data of the third data stream that has been read from the memory that stores the second data stream and the third data stream, and wherein the first producer processing unit controlling its writing of the first data stream to the memory in accordance with the read position record maintained by the first consumer processing unit comprises the first producer memory controller determining whether to request data of the first data stream to be transferred from the first producer buffer to the memory based on the read position record maintained by the first consumer processing unit;

wherein:

the second data stream and the third data stream are different data streams read from the same memory;

the first data stream, the second data stream and the third data stream are all different data streams, or the first data stream is the same data stream as one of the second data stream and the third data stream; and the first consumer processing unit and the second consumer processing unit are the same consumer processing unit or are different consumer processing units.

* * * * *

UNITED STATES PATENT AND TRADEMARK OFFICE
CERTIFICATE OF CORRECTION

PATENT NO. : 11,175,854 B2  
APPLICATION NO. : 16/226584  
DATED : November 16, 2021  
INVENTOR(S) : Persson et al.

Page 1 of 1

It is certified that error appears in the above-identified patent and that said Letters Patent is hereby corrected as shown below:

In the Claims

Column 31, Line 25 (Claim 1, Line 91), please replace "processing are" with -- processing unit are --

Column 35, Line 66 (Claim 13, Line 127), please replace "processing are" with -- processing unit are --

Column 40, Line 20 (Claim 20, Line 136), please replace "processing are" with -- processing unit are --

Signed and Sealed this  
Fifteenth Day of March, 2022

Drew Hirshfeld  
*Performing the Functions and Duties of the  
Under Secretary of Commerce for Intellectual Property and  
Director of the United States Patent and Trademark Office*